US008657923B2

(12) United States Patent
Ito et al.

(10) Patent No.: US 8,657,923 B2
(45) Date of Patent: Feb. 25, 2014

(54) MICROPOROUS CARBON MATERIAL, MANUFACTURING METHOD THEREOF, AND HYDROGEN STORAGE METHOD USING MICROPOROUS CARBON MATERIAL

(75) Inventors: Masashi Ito, Yokosuka (JP); Takashi Kyotani, Natori (JP); Hirotomo Nishihara, Sendai (JP); Peng-Xiang Hou, Shenyang (CN); Li-Xiang Li, Liaoning (CN); Kyohei Hada, Toyohashi (JP); Kazuhiko Mizuuchi, Kitakyushu (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 496 days.

(21) Appl. No.: 12/919,308

(22) PCT Filed: Feb. 25, 2009

(86) PCT No.: PCT/JP2009/053450
§ 371 (c)(1),
(2), (4) Date: Aug. 25, 2010

(87) PCT Pub. No.: WO2009/107678
PCT Pub. Date: Sep. 3, 2009

(65) Prior Publication Data
US 2011/0052486 A1 Mar. 3, 2011

(30) Foreign Application Priority Data

Feb. 26, 2008 (JP) .................................. 2008-045069
Oct. 17, 2008 (JP) .................................. 2008-268753
Feb. 24, 2009 (JP) .................................. 2009-040932

(51) Int. Cl.
*C01B 31/08* (2006.01)
(52) U.S. Cl.
USPC ......................... 95/116; 502/417; 423/445 R
(58) Field of Classification Search
USPC ......................... 95/116; 423/445 R; 502/417
See application file for complete search history.

(56) References Cited

U.S. PATENT DOCUMENTS

| 7,094,276 B2 * | 8/2006 | Kojima et al. .................. 96/153 |
| 2003/0170165 A1 | 9/2003 | Kojima et al. |
| 2005/0129604 A1 | 6/2005 | Pak et al. |
| 2007/0116625 A1 | 5/2007 | Joo et al. |
| 2007/0172721 A1 | 7/2007 | Pak et al. |

FOREIGN PATENT DOCUMENTS

| JP | 2002-029860 B2 | 1/2002 |
| JP | 2003-206112 A | 7/2003 |
| JP | 2005-154268 A | 6/2005 |
| JP | 2006-335596 A | 12/2006 |
| JP | 2007-137754 A | 6/2007 |
| JP | 2007-172887 A | 7/2007 |
| JP | 2007-326732 A | 12/2007 |

OTHER PUBLICATIONS

Coker, E. N. et al., "Nanostructured Pt/C electrocatalysts with high platinum dispersions through zeolite-templating", *Microporous and Mesoporous Materials*, vol. 101, No. 3, Apr. 20, 2007, pp. 440-444.
Su, F. et al., "Template synthesis of microporous carbon for direct methanol fuel cell application", *Carbon*, vol. 43, No. 11, Sep. 2005, pp. 2366-2373.
Ryoo, R. et al., "Synthesis of Highly Ordered Carbon Molecular Sieves via Template-Mediated Structural Transformation", *The Journal of Physical Chemistry B*, vol. 103, No. 37, Sep. 16, 1999, pp. 7743-7746.
Lee, J. et al., "Synthesis of a new mesoporous carbon and its application to electrochemical double-layer capacitors", *Chem. Commun.*, 1999, pp. 2177-2178.
Ma, Z. et al., "Preparation of a high surface area microporous carbon having the structural regularity of Y zeolite", *Chem. Commun.*, 2000, pp. 2365-2366.
Ma, Z. et al., "Synthesis methods for preparing microporous carbons with a structural regularity of zeolite Y", *Carbon*, vol. 40, 2002, pp. 2367-2374.
Supplementary European Search Report dated Oct. 7, 2013, (8 pgs.).
Japanese Office Action and English Language Translation dated Oct. 15, 2013; (6 pgs.).

* cited by examiner

*Primary Examiner* — Stuart Hendrickson
(74) *Attorney, Agent, or Firm* — Foley & Lardner LLP

(57) ABSTRACT

The present invention provides a microporous carbon material capable of expressing functions that supported metal has while maintaining pore functions that the microporous carbon material inherently possesses. The microporous carbon material 5 includes: a three-dimensional long-range ordered structure within a range from 0.7 nm or more to 2 nm or less; and micropores 2a, wherein a transition metal 4 is supported on surfaces of the micropores 2a. The microporous carbon material is obtained by a method including: introducing an organic compound on a surface of and inside the micropores of a porous material containing transition metal, and obtaining a composite of the microporous carbon material containing the transition metal and the porous material by carbonizing the organic compound by a chemical vapor deposition method; and removing the porous material. Alternatively, the microporous carbon material is obtained by a method including: introducing an organic compound on a surface of a porous material and obtaining a microporous carbon material by a chemical vapor deposition method; and supporting the transition metal on a surface of the microporous carbon material by immersing and impregnating the microporous carbon material in a transition metal salt solution.

13 Claims, 17 Drawing Sheets

(a)

(b)

(c)

(d)

MICROPOROUS CARBON MATERIAL, MANUFACTURING METHOD THEREOF, AND HYDROGEN STORAGE METHOD USING MICROPOROUS CARBON MATERIAL

TECHNICAL FIELD

The present invention relates to a microporous carbon material favorably applied to a hydrogen storage material and a fuel cell electrode catalyst, a method of manufacturing the microporous carbon material, and a hydrogen storage method using the microporous carbon material.

BACKGROUND ART

Recently, a use of hydrogen has drawn attention as a clean energy source. However, hydrogen is gas that is not condensed in room temperature. Therefore, it is difficult to transfer and store hydrogen, which has become an obstacle to the use of hydrogen. Accordingly, various methods of, for example, compressing to high pressure, condensing at low temperature, and using a hydrogen storage alloy and chemical hydride, have been proposed. Meanwhile, these methods have both advantages and disadvantages.

In view of such a situation, a use of a carbon material has been attempted as a hydrogen storage material. In order to synthesize the carbon material having a high hydrogen storage capacity, it is necessary to design and synthesize the carbon material at a molecular level, specifically for example, to synthesize the carbon material having an ordered structure at a micro level. A conventional aim is to synthesize the carbon material mainly focusing on carbonizing existing materials such as pitch that is a heavy aromatic compound obtained from oil and coal and general-purpose polymers, so as to achieve an intended structure and property as much as possible. Thus, it is difficult to synthesize the carbon material designed at the molecular level by such a conventional synthesizing method.

As for the method of synthesizing a mesoporous carbon material having an ordered structure, a method using mesoporous silica as a template has been proposed (Roo R, et al., J. Phys. Chem. B1999; 103: 7743-7746, Lee J, et al., Chem. Commun. 1999; 2177-2178). This method can synthesize a mesoporous structure with regularity, however, cannot synthesize a microporous structure with smaller pores and regularity. Therefore, the group of the inventors of the present invention has proposed a method of synthesizing the microporous structure by using Y-type zeolite as a template (Japanese Patent No. 3951567, Japanese Patent Unexamined Publication No. 2003-206112, Kyotani, et al., Chem. Commun. 2000; 2365-2366, MaZX, et al., Carbon, 40: pp. 2367-2374 (2002)).

DISCLOSURE OF INVENTION

In general, in order to provide functionality to the microporous structure, it is necessary to dope or support transition metal inside micropores. However, according to the conventional method of manufacturing the microporous carbon material, the microporous carbon material has a small BET surface area up to several hundreds m²/g, and diameters of the micropores are not controlled. Accordingly, doping or supporting effects of the transition metal cannot be obtained sufficiently. Possibly, pore functions that the microporous carbon material inherently possesses may be impaired due to a reduction of the specific surface area of the microporous carbon material caused by adding the transition metal even if effects of adding the transition metal is expressed.

The present invention has been made focusing on the above-described problems in the conventional art. A microporous carbon material according to the present invention includes: a three-dimensional long-range ordered structure within a range from 0.7 nm or more to 2 nm or less; and micropores, wherein transition metal is supported on surfaces of the micropores.

A method of manufacturing a microporous carbon material according to the present invention includes: introducing a first organic compound on a surface of and inside micropores of a porous material containing transition metal, and obtaining a composite of a microporous carbon material containing the transition metal and the porous material by carbonizing the first organic compound by a chemical vapor deposition method; and removing the porous material. In addition, another method of manufacturing a microporous carbon material according to the present invention includes: a first step of introducing an organic compound on a surface of and inside micropores of a porous material, and obtaining a composite of a microporous carbon material and the porous material by carbonizing the organic compound by a chemical vapor deposition method; a second step of removing the porous material; and a third step of supporting transition metal on a surface of the microporous carbon material by immersing and impregnating the microporous carbon material obtained by the second step in a transition metal salt solution.

A hydrogen storage method according to the present invention uses the microporous carbon material according to the present invention as described above, wherein hydrogen is adsorbed and desorbed at a temperature within a range from −40° C. to 150° C.

BEST MODE FOR CARRYING OUT THE INVENTION

A description will be made below in detail of a microporous carbon material, a method of manufacturing the microporous carbon material, and a hydrogen storage method using the microporous carbon material according to an embodiment of the present invention.

<Microporous Carbon Material>

Figure 1:
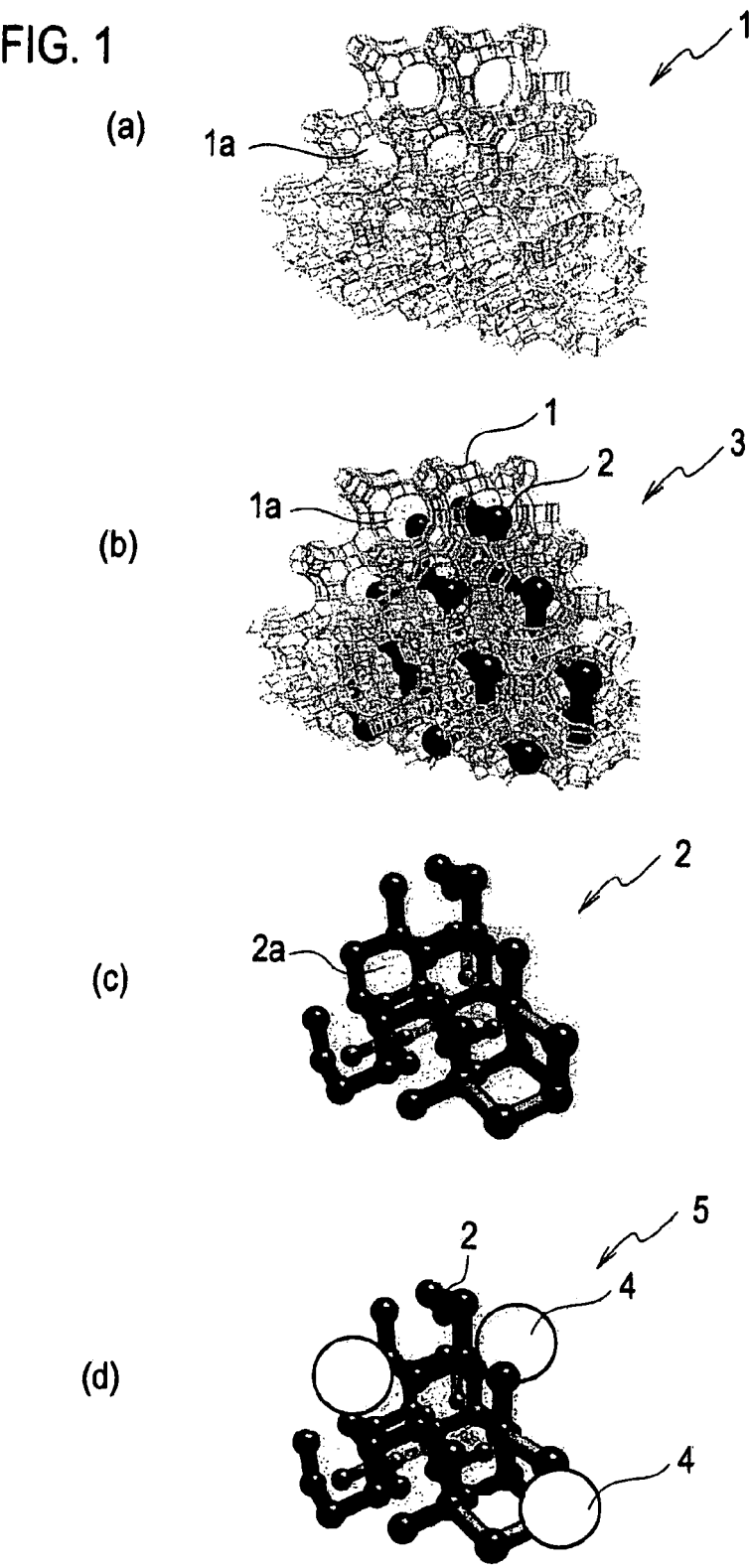
FIG. 1(a) is a view showing a porous material to be used in a method of manufacturing a microporous carbon material according to an embodiment of the present invention.
FIG. 1(b) is a view showing a composite of a porous material and a microporous carbon material.
FIG. 1(c) is a typical view showing one example of a microporous carbon material.
FIG. 1(d) is a typical view showing one example of a microporous carbon material according to an embodiment of the present invention.

FIG. 1 shows a typical example of the microporous carbon material according to the embodiment of the present invention. A microporous carbon material 5 according to the embodiment of the present invention shown in FIG. 1(d) uses a zeolite 1 as a porous material, and is a material in which a platinum 4 as transition metal is supported on a zeolite carbon 2 obtained from the zeolite 1 as a template. Specifically, the zeolite carbon 2 shown in FIG. 1(c) is obtained by introducing an organic compound as a carbon source to micropores 1a of the zeolite 1 shown in FIG. 1(a) and heating the compound to obtain a composite 3 of the zeolite 1 and the zeolite carbon 2 shown in FIG. 1(b), followed by removing only the zeolite 1. The zeolite carbon 2 has a three-dimensional long-range ordered structure within a range from 0.7 nm or more to 2 nm or less and micropores 2a, to which structural characteristics of the zeolite 1 used as a template are reflected.

The zeolite carbon 2 is a porous carbon material to which the structural characteristics of the zeolite 1 as a template material to be used having a specific three-dimensional ordered structure are reflected in its production. The zeolite carbon 2 has a structure in which fine pores (the micropores 2a) having a diameter within a range from 0.1 nm to 2 nm are connected to each other in a net-like pattern. Specifically, as shown in FIG. 1(c), the zeolite carbon 2 has the three-dimensional long-range ordered structure within a range from 0.5 nm to 100 nm, and has the micropores 2a. More specifically, a distance between carbon chains of the zeolite carbon 2 is preferably between 0.5 nm and 100 nm, more preferably, the distance between the carbon chains is between 0.7 nm and 50 nm, and still more preferably, the distance between the carbon chains is between 0.7 nm and 2 nm. Thus, the zeolite carbon 2 is the carbon material having the structure in which the carbon chains are three-dimensionally and regularly repeated in a long-range with arbitrary intervals. Note that, IUPAC (International Union of Pure and Applied Chemistry) defines a fine pore with a diameter of 2 nm or less as a micropore, a fine pore with a diameter between 2 nm and 50 nm as a mesopore, and a fine pore with a diameter of 50 nm or more as a macropore. Substances having micropores are collectively referred to as a microporous material.

The microporous carbon material 5 according to the embodiment of the present invention includes the transition metals 4, which are supported on surfaces of the micropores 2a. Note that, the surfaces of the micropores 2a represent the surfaces of the micropores 2a of the zeolite carbon 2 composing the microporous carbon material 5, and also represent the inside surfaces of the micropores 2a. The transition metals 4 may be supported not only on the surfaces of the micropores 2a, but also on the other portions other than the micropores 2a, namely, an outer surface of the zeolite carbon 2. The transition metals 4 are preferably supported in a concentration within a range from 0.01 to 10 wt % on the microporous carbon material 5. In such a case, the transition metals 4 are supported on the surfaces of the micropores in a fine particle state. When the concentration of the supported transition metals 4 is 0.01 wt % or less, functions of the transition metals cannot be obtained sufficiently. On the other hand, when the concentration of the supported transition metals 4 is 10 wt % or more, a BET specific surface area is reduced, or fine particles of the transition metals become too large. A diameter of the fine pores of the transition metals is preferably 3 nm or less. In this regard, a smaller diameter is more preferable in order to maintain the functions of the transition metals and the high BET specific surface area. When the concentration of the transition metal is between 0.01 to 10 wt %, it is possible to obtain the microporous carbon material in which the functions that the supported transition metals have can be expressed while maintaining the pore functions.

While metal to be supported is preferably transition metal in view of a provision of functionality, other metal other than transition metal may be applicable. The transition metal may be supported as single metal. Alternatively, the transition metal may include two or more kinds of metal or alloy to be supported. When providing a function resistant to oxidation, platinum of transition metal is preferably used. When platinum is used, the concentration thereof is preferably between 0.05 and 6 wt %. In order to obtain functions of the supported metal, the concentration of metal is more preferably at least 0.05 wt % or more. Increasing the amount of metal to be used causes an increase in cost. Especially, using noble metal such as platinum and rare metal results in high cost. Therefore, the concentration of metal to be supported is preferably up to approximately 6 wt % or less. Although it is technically possible to use metal with the concentration more than the above-mentioned value, better performance improvement may not be achieved in general for its supporting amount.

The transition metal to be used includes titanium, vanadium, chromium, manganese, iron, cobalt, nickel, copper, zirconium, molybdenum, ruthenium, rhodium, palladium and lanthanoid series such as lanthanum and cerium, other than platinum. Under a usage circumstance capable of maintaining a reduction atmosphere in a manufacturing process and a use of hydrogen storage, metal to be supported without resistance to oxidation is available. In such a case, transition metal to form a metal-bond or interstitial hydride (M-H bond) can be used. Especially, in view of a resource matter, the transition metal to form a metal-bond or interstitial hydride (M-H bond) is preferably used.

In the microporous carbon material 5 according to the embodiment of the present invention, a volume occupied by the micropores 2a is preferably $1.0 \text{ cm}^3/\text{g}$ or more in a state of supporting the transition metals 4, more preferably, the volume occupied by the micropores 2a is $1.2 \text{ cm}^3/\text{g}$ or more, and still more preferably, the volume occupied by the micropores 2a is $1.5 \text{ cm}^3/\text{g}$ or more. In addition, a BET specific surface area of the microporous carbon material 5 according to the embodiment of the present invention is preferably 2500 $\text{cm}^2/\text{g}$ or more in a state of supporting the transition metals 4, more preferably, the BET specific surface area is 3000 $\text{cm}^2/\text{g}$ or more, and still more preferably, the BET specific surface area is 3500 $\text{cm}^2/\text{g}$ or more. When the volume occupied by the micropores is $1.0 \text{ cm}^3/\text{g}$ or less or the BET specific surface area is 2500 $\text{cm}^2/\text{g}$ or less, hydrogen storage performance of the microporous carbon material may not be obtained sufficiently. When the microporous carbon material according to the embodiment of the present invention is used as a hydrogen storage material, the larger volume occupied by the micropores is preferable. In particular, an A/B ratio of a volume A occupied by the micropores and a volume B occupied by fine pores (mesopores) having a diameter within a range from 2 nm to 50 nm is at least 2 or more, more preferably 3 or more. When the A/B ratio is lowered, the hydrogen storage performance may be lowered even if the specific surface areas of the micropores and the mesopores are the same.

The microporous carbon material according to the embodiment of the present invention has a certain structural feature, in which the less two-dimensional layer regularity is, the higher a gas adsorbing ability and the like is. When a powder X-ray diffraction measurement is performed, for example, an X-ray diffraction pattern preferably has less diffraction peaks generally present at around 26°, which represents the two-dimensional layer regularity. The presence of the diffraction peaks at around 26° represents an increase of a nonporous carbon layer and represents a reduction of the BET specific surface area.

The microporous carbon material according to the embodiment of the present invention can adsorb and desorb hydrogen at a temperature within a range from −40° C. to 150° C. Conventionally, there has been a problem that the hydrogen storage amount of a carbon material with no metal support is lowered as a temperature increases. However, the microporous carbon material according to the embodiment of the present invention is a material in which a temperature dependence of the hydrogen storage ability is modified, whereby the hydrogen storage ability is improved as a temperature increases. The maximum temperature of 150° C. is defined in view of stability of a material and design flexibility of a housing filled with the material. Considering waste heat utilization of a fuel cell, the microporous carbon material is preferably used at a temperature of 100° C. or less. Moreover, the microporous carbon material according to the embodiment of the present invention not only has the hydrogen storage ability, but also can easily desorb the adsorbed hydrogen. Therefore, the microporous carbon material according to the embodiment of the present invention can be used effectively as a hydrogen storage material. As described above, since the hydrogen storage method according to the embodiment of the present invention employs the microporous carbon material according to the embodiment of the present invention, it is possible to adsorb and desorb hydrogen efficiently at low temperature.

<Method of Manufacturing Microporous Carbon Material>

The microporous carbon material according to the embodiment of the present invention can be obtained by a method including: a step of introducing an organic compound on a surface of and inside micropores of a porous material containing transition metal, and obtaining a composite of the microporous carbon material containing the transition metal and the porous material by carbonizing the organic compound by a chemical vapor deposition method; and a step of removing the porous material. Alternatively, the microporous carbon material according to the embodiment of the present invention can be obtained by a method including: a first step of introducing an organic compound on a surface of and inside micropores of a porous material, and obtaining a composite of the microporous carbon material and the porous material by carbonizing the organic compound by a chemical vapor deposition method; a second step of removing the porous material; and a third step of supporting transition metal on a surface of the microporous carbon material by immersing and impregnating the microporous carbon material obtained by the second step in a transition metal salt solution. Hereinafter, more details will be explained.

In order to obtain the microporous carbon material having the above-described structural characteristics, the porous material having holes inside the structure and having a structure in which the holes are connected to each other in a net-like pattern is used as a template. Next, the organic compound is introduced to a surface of and inside the micropores of the porous material under a heating condition, and the organic compound is carbonized by heating, so as to deposit carbon in the porous material. Then, the porous material as a template is removed. Due to this method, the microporous carbon material having the micropores can be easily manufactured. Note that, the carbonization of the organic compound and the deposition of carbon are performed by a Chemical Vapor Deposition (CVD) method, for example.

The porous material as a template is required to be able to introduce the organic compound inside the micropores, stably maintain the original structure at the CVD method, and separate from the generated microporous carbon material. Thus, the porous material is preferably a material with good heat resistance such as porous oxide, and preferably dissolved by acid and alkali. As described above, the microporous carbon material is synthesized while the template configuration is transcribed. Therefore, the porous material as a template is preferably a material in which a crystal (structure) is sufficiently developed, a particle diameter is even, and a composition is uniform. In view of a material property that the porous material should have and a property of the microporous carbon material to be obtained, zeolite is preferably used as a porous material. Zeolite is an aluminosilicate, in which some of silicon (Si) having a silica structure is substituted by aluminum (Al), and in which cations are distributed in its structure since a framework itself has a negative charge. In addition, zeolite can have various crystal structures depending on Si/Al molar ratios, types and the amount of cations, and the number of water molecules hydrated by the cations. Moreover, zeolite is a porous material that has various sizes of fine pores with a two-dimensionally connected structure or a three-dimensionally connected structure, for example. Typical zeolite includes a material having a void structure such as cage or supercage. In particular, in zeolite, FAU-type zeolite is preferably used, and in FAU-type zeolite, Y-type zeolite is more preferably used. The porous material can be removed by any methods as long as the generated microporous carbon material can be separated from the porous material by the methods. Zeolite can be dissolved by acid. Therefore, the porous material can be easily dissolved by using hydrochloric acid and hydrofluoric acid, for example.

In order to obtain the microporous carbon material in which the transition metal is supported on the surfaces of the micropores, the porous material containing the transition metal is used as a template. By introducing the organic compound to the surface of and inside the micropores of the porous material and carbonizing the organic compound by heating, the composite of the microporous carbon material and the porous material to which the structure of the porous material is reflected and the transition metal is transcribed on its surface can be obtained. By processing the obtained composite by acid and by removing the porous material, the microporous carbon material in which the transition metal is supported on the surfaces of the micropores can be easily obtained. The porous material containing the transition metal can be easily obtained by, for example, an ion exchange of the porous material. The transition metal to be used includes platinum, for example.

The CVD method used for carbonizing the organic compound to deposit carbon on the porous material is an industrially-used method for forming a thin film composed of a specific element or elemental composition (such as a thin film composed of carbon) on a substrate such as a template. This method is a technique that a raw material substance is radicalized due to a chemical reaction and thermal decomposition so as to have high reactivity generally by providing energy to gas including the raw material substance by heat and light, or by performing plasma treatment with high frequency. As a result, the raw material substance is absorbed and deposited on the substrate. Note that, the CVD method may be divided into several methods, including a thermal CVD method to deposit a raw material substance by increasing temperature, a light CVD method to irradiate with light in order to promote a chemical reaction and thermal decomposition, and a plasma CVD method to excite gas so as to be in a plasma state.

The organic compound used in the CVD method is preferably in a vapor state at room temperature, or preferably a material that can be vaporized. A method for vaporization includes heating to a boiling point or more, reducing pressure in an atmosphere, and the like. The organic compound to be used can be appropriately selected from carbon-derived substances known by one of ordinary skill in the art. Particularly, a compound thermally decomposed by heating is preferable. For example, a compound capable of depositing carbon on a framework (for example, a silica-gel framework) of the porous material to be used as a template in the CVD method is preferable.

The organic compound to be used may be an organic compound containing hydrogen. The organic compound may be an unsaturated or saturated organic compound, or may be a mixture thereof. The organic compound to be used may contain unsaturated linear chain or branch chain carbon hydride with a double bond or a triple bond, saturated linear chain or branch chain carbon hydride, and the like. In addition, the organic compound may contain saturated cyclic carbon hydride, aromatic carbon hydride, and the like. The organic compound includes, for example, acetylene, methyl acetylene, ethylene, propylene, isoprene, cyclopropane, methane, ethane, propane, benzene, vinyl compound, and ethylene oxide. In particular, the organic compound to be used is preferably a material capable of entering the micropores of the porous material, such as acetylene, ethylene, methane, and ethane. The CVD method at higher temperature and the CVD method at lower temperature may employ the same material as an organic compound or may employ different materials from each other. For example, the CVD method at lower temperature may employ acetylene, ethylene, and the like, and the CVD at higher temperature may employ propylene, isoprene, benzene, and the like.

When introducing the organic compound into the micropores of the porous material, a pressure of the porous material may be preliminarily reduced, or a pressure of the system itself may be reduced. According to the embodiment of the present invention, any methods may be employed as long as carbon is deposited by the CVD method since the porous material according to the embodiment of the present invention is stable. Generally, carbon generated by the chemical reaction or thermal decomposition of the organic compound is deposited (or adsorbed) on the framework of the porous material, thereby obtaining the composite composed of the microporous carbon material including the porous material and carbon. When performing the CVD method, the heating temperature can be arbitrarily and appropriately selected according to the organic compound to be used. Generally, the heating temperature is preferably between 400 and 1500° C., more preferably, between 450 and 1100° C., still more preferably, between 500 and 900° C., even still more preferably, between 550 and 800° C., particularly preferably, between 575 and 750° C., and most preferably, between approximately 600 and 700° C. Alternatively, the heating temperature can be arbitrarily and appropriately selected according to a CVD processing time and/or pressure in the reaction system. The CVD processing time preferably has enough time to obtain carbon deposition, and can be arbitrarily and appropriately determined according to the organic compound to be used and temperature.

The CVD method can be performed under a decompression or vacuum, pressurization, or inert gas atmosphere. When performing under an inert gas atmosphere, inert gas includes, for example. $N_2$ gas, helium, neon and argon. Generally in the CVD method, the organic compound in a vapor state is heated while being transferred so as to come into contact with the porous material with carrier gas, thereby easily depositing carbon on the porous material in a gas-phase. The type, flow velocity, flow rate and heating temperature of the carrier gas are arbitrarily controlled according to the organic compound to be used and the type of the porous material. The carrier gas includes the above-mentioned inert gas, for example. In mind of an explosion limit, a mixture with oxygen gas or hydrogen gas is applicable.

As for a condition for depositing carbon in the micropores of the porous material by the CVD method, the amount of filling of carbon in the micropores is preferably within a range from 10 to 40 wt %. More preferably, the amount of filling of carbon is controlled to be within a range from 15 to 30 wt %. When the amount of filling of carbon is 10 wt % or less, carbon necessary to form a carbon framework is insufficient, and it is difficult to maintain a stable ordered structure. Meanwhile, when the amount of filling of carbon is 40 wt % or more, redundant carbon is attached, which results in a reduction of the micropore volume and the BET specific surface area.

After the deposition (adsorption) of carbon by the CVD method, the composite of the porous material and the microporous carbon material may be further heated at higher temperature than the CVD temperature. Although the heating temperature can be arbitrarily selected according to the organic compound to be used, it is generally between 700 and 1500° C. The heating temperature is preferably between 750 and 1200° C., more preferably, between 800 and 1100° C., still more preferably, between 825 and 1000° C., particularly preferably, between 850 and 950° C., and most preferably, between 875 and 925° C. Alternatively, the heating temperature can be appropriately selected according to a heating time and/or pressure in the reaction system. In addition, with regard to the heating time, the generated substance is analyzed by use of an analyzing method disclosed in the description of the present invention, whereby the enough time necessary to deposit carbon is determined based on the analysis result.

The organic compound may be further introduced to the composite of the porous material and the microporous carbon material, followed by heating the composite, so as to further deposit carbon. In such a case, the structure of the microporous carbon material obtained by the CVD method is more stable. The carbonization may be performed by the CVD method, or by the other heating methods. Moreover, the heating temperature may be higher or lower than the CVD temperature. Furthermore, the organic compound to be introduced may be the same or different from the organic compound introduced by the CVD method. Such an operation may be repeated several times.

Before introducing the organic compound on the surface of and into the micropores of the porous material and performing the CVD, the organic compound may be impregnated and carbonized. The organic compound that is impregnated and has a smaller molecular size than a diameter of the micropores of the porous material can be used. Particularly, the organic compound to be used preferably includes a thermally polymerizable monomer such as a furfuryl alcohol with high carbon yield. The impregnating method of the organic compound can employ a known means such as bringing into contact with the porous material directly if the monomer is liquid, or after dissolving the monomer in a solvent if the monomer is solid. The excess monomer remaining on the surface of the porous material is preferably removed preliminarily by washing, and the like. For example, by bringing the porous material into contact with the furfuryl alcohol at room temperature under reduced pressure, followed by placing the mixture under atmospheric pressure again, the furfuryl alcohol can be introduced into the micropores of the porous material. Excess alcohol adsorbed to the surface of the porous material can be removed by washing by an organic solvent.

The organic compound can be used unlimitedly as long as the organic compound has a size enough to be inserted into the micropores of the porous material and remains inside the micropores as carbon at carbonization. For example, the organic compound includes a vinyl compound such as vinyl acetate, acrylonitrile and vinyl chloride, a vinylidene compound such as vinylidene chloride and methyl methacrylate, a vinylene compound such as maleic acid anhydride, and an epoxy derivative such as ethylene oxide. In addition, sugar such as glucose and saccharose, an aliphatic polyhydric alcohol, an aromatic polyhydric alcohol (diol) such as resorcinol and catechol, a nitrogen-containing heterocycle compound such as thiophene, and a nitrogen-containing heterocycle compound such as pyridine and pyrimidine can also be used.

The microporous carbon material according to the embodiment of the present invention can be obtained by a method including: the first step of introducing an organic compound on a surface of and inside micropores of a porous material, and obtaining a composite of the microporous carbon material and the porous material by carbonizing the organic compound by a chemical vapor deposition method; the second step of removing the porous material; and the third step of supporting transition metal on a surface of the microporous carbon material by immersing and impregnating the microporous carbon material obtained by the second step in a transition metal salt solution. Due to this method, the microporous carbon material in which the transition metal is supported on the surfaces of the micropores can be easily obtained by using the porous material not including transition metal. In the first step and the second step of this method, the microporous carbon material having the three-dimensional long-range ordered structure within a range from 0.7 nm or more to 2 nm or less and the micropores is obtained. Then, the obtained microporous carbon material is immersed and impregnated in the transition metal salt solution, and the transition metal adsorbed to the microporous carbon material is reduced, thereby supporting the transition metal on the surfaces of the micropores. As for the method of reducing the transition metal, a liquid-phase reduction and a gas-phase reduction are included.

Next is an explanation of a method of supporting transition metal on the surfaces of the micropores by a liquid-phase reduction. The above-mentioned third step includes: an immersing step of immersing and impregnating the microporous carbon material in the transition metal salt solution, so as to obtain a mixed liquid; a separating step of separating the microporous carbon material to which the transition metal is adsorbed by a centrifugation after stirring the mixed liquid under reduced pressure; a liquid-phase reducing step of mixing the microporous carbon material to which the transition metal is adsorbed obtained by the centrifugation with a reductant solution, and reducing the adsorbed transition metal in a liquid phase, so as to deposit on the surface of and inside the micropores of the microporous carbon material; and a drying step of drying the microporous carbon material on which the transition metal is deposited after washing by pure water. Due to the liquid-phase reduction, the transition metal adsorbed to the microporous carbon material can be reduced and precipitated.

The transition metal salt solution is preferably prepared with a concentration within a range from 10 ppm or more to 5 wt % or less. When the concentration is 10 ppm or less, supporting effects of the transition metal cannot be obtained. On the other hand, when the concentration is 5 wt % or more, the BET specific surface area is reduce since the supporting amount of the transition metal is too much. As a result, pore functions that the microporous carbon material inherently possesses are impaired.

The solvent to dissolve transition metal salt preferably has a boiling point of 100° C. under normal pressure considering a removal of solvent and a drying in the later process. In view of the boiling point of 100° C. or less and solubility of metal salt, any one of water, alcohol, acetone, ether, and the like is preferably used. Alternatively, a mixed solvent thereof can be used. In the manufacturing process, the solvent is preferably a solvent that does not have an influence on oxidation of the transition metal to be supported, and the like, and a solvent that is not reduced by a reducing agent described later. When using the transition metal to be supported, including titanium, vanadium, chromium, manganese, iron, cobalt, nickel, copper, zirconium, molybdenum, ruthenium, rhodium, palladium, and lanthanoid series such as lanthanum and cerium, preferably, the solvent does not include water. Moreover, a primary alcohol or ether is preferably used as a solvent.

The method of reducing an attached metal ion uses a reducing agent dissolved in a solvent, and the reducing agent solution preferably contains a hydrido complex. The hydrido complex preferably includes any one of sodium borohydride, lithium borohydride, sodium cyanoborohydride, zinc borohydride and sodium triacetoxyborohydride, or two or more of them.

Next is an explanation of a method of supporting transition metal on the surfaces of the micropores by a gas-phase reduction. The above-described third step includes: an immersing step of immersing and impregnating the microporous carbon material in the transition metal salt solution, so as to obtain a mixed liquid; an evaporation-to-dryness step of separating the microporous carbon material to which the transition metal is adsorbed from the mixed liquid by evaporating to dryness; and a gas-phase reducing step of reducing the transition metal in the microporous carbon material obtained by evaporating to dryness by a gas-phase reduction using hydrogen. In the gas-phase reduction, the reducing agent easily enters the micropores of the microporous carbon material. Therefore, it is possible to control the amount and the support condition of the transition metal supported on the microporous carbon material. According to the method using the gas-phase reduction, it is possible to control the diameter of the micropores, and possible to support the transition metal without impairing the pore functions that the microporous carbon material inherently possess.

Gas to be used in reduction can be reducing gas if the gas is capable of reducing attached transition metal ion. In order to reduce the transition metal under a moderate condition as much as possible, hydrogen is preferably used as reducing gas. The reduction temperature is required to increase, which is different from the case of the liquid-phase reduction. In view of a processing speed and damage of the microporous carbon material, the reduction is preferably performed within a range from approximately 100 to 350° C.

EXAMPLE

A description will be made below in further detail of the microporous carbon material and the method of manufacturing the microporous carbon material according to the embodiment of the present invention by Examples 1 to 9 and Comparative Examples 1 to 4. However, the scope of the present invention is not limited to those examples.

1. Preparation of Samples

Example 1

PtY-PFA-5P7(0.5)-H9(3)

In Example 1, 2.0 g of dried NaY zeolite was mixed with 200 ml of $Pt(NH_3)_4Cl_2$ aqueous solution (a concentration of 2.62 M) and stirred for 24 hours at room temperature. Next, the aqueous solution was filtered, and the precipitate was washed by pure water several times. The filtered material was dried in vacuum for 8 hours at 70° C., thereby obtaining platinum-supported zeolite (PtY). Next, the PtY was impregnated with a furfuryl alcohol (FA) to polymerize in micropores of the PtY, thereby preparing PtY (PtY-PFA) in which the micropores were filled with a polyfurfuryl alcohol (PFA). Next, the PtY-PFA was heated under a nitrogen atmosphere to 700° C. Propylene gas was then introduced to the PtY-PFA with a mixture ratio of 5 vol % and CVD was performed for 0.5 hours, followed by heat-treating for 3 hours at 900° C. Then, zeolite was dissolved and removed from the heat-treated PtY-PFA by a hydrofluoric acid treatment, thereby obtaining a microporous carbon material (hereinafter, designated by MPC) of Example 1. The obtained MPC is designated by PtY-PFA-5P7(0.5)-H9(3) as a sample.

Example 2

PtY-PFA-7P7(1)-H9(3)

In Example 2, similar operations to those in Example 1 were repeated except that propylene gas was introduced to the PtY-PFA with a mixture ratio of 7 vol % and the CVD was performed for 1 hour. In Example 2, PtY-PFA-7P7(1)-H9(3) was obtained as MPC.

Example 3

PtY-PFA-H7(1)-7P7(1)-H9(3)

In Example 3, the PtY-PFA was heated under a nitrogen atmosphere, followed by heat-treating for 1 hour at 700° C. Then, propylene gas was introduced to the PtY-PFA with a mixture ratio of 7 vol % and the CVD was performed for 1 hour. Similar operations to those in Example 1 were repeated except that propylene gas was introduced to the PtY-PFA with the mixture ratio of 7 vol % and the CVD was performed for 1 hour. In Example 3, PtY-PFA-H7(1)-7P7(1)-H9(3) was obtained as MPC.

Example 4

ZTC/Pt-0.8% (w)

Example 4 is an example in which platinum is supported by a liquid-phase reduction. Approximately 15 g of powdered zeolite was put in a round-bottom flask, and dried in vacuum for 8 hours at room temperature. Next, the round-bottom flask was immersed in an oil bath and the zeolite was dried in vacuum for 8 hours at 150° C., followed by cooling to room temperature. Next, approximately 400 ml of the FA was poured in the round-bottom flask under a vacuum atmosphere, nitrogen was introduced to the round-bottom flask, followed by returning to atmospheric pressure and stirring for 8 hours under a nitrogen atmosphere, thereby impregnating the micropores of zeolite with the FA. Next, the FA/zeolite composite was extracted from the round-bottom flask, and the FA adhered to an outer surface of the composite was washed by mesitylene and filtered. Next, approximately 15 g of the FA/zeolite composite was put in a quartz reaction tube (inner diameter of 29 mm), and heat-treated for 24 hours at 80° C. while circulating nitrogen. Then, the composite was further heat-treated for 8 hours at 150° C., and the FA in the micropores of zeolite was heated and polymerized, thereby obtaining a PFA/zeolite composite. Next, approximately 0.5 g of the PFA/zeolite composite was put in the quartz reaction tube and heated to 700° C. while circulating nitrogen, so as to carbonize the PFA. Next, propylene (concentration of 2 vol %) was circulated for 1 hour while keeping at 700° C., followed by further filling the micropores of zeolite with carbon.

Next, the composite was heated to 900° C. while circulating nitrogen and kept for 3 hours. Next, 0.5 g of the obtained carbon/zeolite composite was poured in 100 ml of 47 wt % of hydrofluoric acid, followed by stirring for 5 hours, so as to dissolve and remove zeolite. Then, the resultant composite was washed and filtered, followed by reducing pressure and dried for 8 hours at 150° C., thereby obtaining MCP(PFA-2P7(1)-H9(3) as a sample) of which a BET specific surface area was approximately 4000 $m^2/g$.

Then, a solution A in which 5 mg of 4.54 wt % of $[Pt(NH_3)_2(NO_2)_2]/HNO_3$ aqueous solution was diluted with 2.0 g of pure water and a solution B in which 2.4 mg of $NaBH_4$ was diluted with 20 ml of pure water were prepared, followed by cooling the solutions A and B to 0° C. The concentration of the solutions A and B was calculated so that the supported amount of platinum was 0.8 wt % with respect to the MPC. Next, 30 mg of the MPC was put in the solution A at 0° C., followed by stirring for 30 minutes at 0° C. under a reduced-pressure atmosphere. Next, the resultant solution was mixed with the solution B at 0° C. by centrifuging, and stirred for 10 minutes at 0° C., thereby reducing $Pt(NH_3)_2(NO_2)_2$ and generating platinum nanoparticles. Then, the MPC on which the platinum nanoparticles was supported was filtered and washed by pure water several times, followed by drying in vacuum for 6 hours at 150° C., thereby obtaining MPC on which platinum was supported (ZTC/Pt-0.8% (w) as a sample).

Example 5

ZTC/Pt-4% (w)

Similar operations to those in Example 4 were repeated except that the solution A was prepared by diluting 25 mg of 4.54 wt % of $[Pt(NH_3)_2(NO_2)_2]/HNO_3$ aqueous solution with 2.0 g of pure water, and the solution B was prepared so as to increase the amount thereof by 5 times, so that the supported amount of platinum was 4 wt % with respect to the MPC, thereby obtaining MPC on which platinum was supported (ZTC/Pt-4% (w) as a sample).

Example 6

ZTC/Pt-0.8% (e)

In Example 6, a solution C in which 5 mg of 4.54 wt % of $[Pt(NH_3)_2(NO_2)_2]/HNO_3$ aqueous solution was diluted with 2.0 g of ethanol and a solution D in which 2.4 mg of $NaBH_4$ was diluted with 20 ml of ethanol were prepared, followed by cooling the solutions C and D to 0° C. The concentration of the solutions C and D was calculated so that the supported amount of platinum was 0.8 wt % with respect to the MPC. Next, 30 mg of the MPC(PFA-2P7(1)-H9(3) as a sample), of which the BET specific surface area was approximately 4000 $m^2/g$, prepared by the similar operations to those in Example 4 was put in the solution C at 0° C., and was subject to an ultrasonic treatment for 5 minutes at 0° C. under atmospheric pressure, followed by stirring for 30 minutes under a reduced-pressure atmosphere. Next, the MPC was mixed with the solution D at 0° C. by centrifuging, and stirred for 10 minutes at 0° C., thereby reducing $Pt(NH_3)_2(NO_2)_2$ and generating platinum nanoparticles. Then, the MPC on which the platinum nanoparticles was supported was filtered and washed by pure water several times, followed by drying in vacuum for 6 hours at 150° C., thereby obtaining MPC on which platinum was supported (ZTC/Pt-0.8% (e) as a sample).

Example 7

ZTC/Pt-4% (e)

Similar operations to those in Example 6 were repeated except that the solution C was prepared by diluting 25 mg of 4.54 wt % of $[Pt(NH_3)_2(NO_2)_2]/HNO_3$ aqueous solution with 2.0 g of pure water, and the solution D was prepared so as to increase the amount thereof by 5 times, so that the supported amount of platinum was 4 wt % with respect to the MPC, thereby obtaining MPC on which platinum was supported (ZTC/Pt-4% (e) as a sample).

Example 8

ZTC/Pt-5.8% ($H_2$)

Example 8 is an example in which platinum is supported by a gas-phase reduction. 200 mg of dried ZTC was added to 20 ml of acetone, followed by stirring for 0.5 hours at room temperature. The ZTC used for supporting platinum is PFA-2P7(1)-H9(3), of which the BET specific surface area was approximately 4000 $m^2/g$, prepared by the similar operations to those in Example 4. While the prepared liquid was stirred strongly, 2 ml of acetone containing 32.86 mg of $H_2PtCl_6 \cdot 6H_2O$ was added dropwise to the prepared liquid slowly taking 10 minutes. The added amount of platinum is to be 5.8 wt % if it is assumed that platinum would be all supported on the ZTC. The mixed liquid was subject to an ultrasonic treatment for 1 hour, followed by stirring for 24 hours at room temperature. The obtained mixed liquid was heated for 10 hours at 60° C. to evaporate acetone. The obtained mixture was put on a quartz boat to place in a quartz reaction tube, followed by heat-treating for 2 hours at 120° C. in an $N_2$ flow so as to remove acetone and moisture completely. Then, atmospheric gas was exchanged for $H_2$, followed by heating the mixture to 300° C. by 1° C. per minute and keeping at 300° C. for 2 hours, so as to reduce $H_2PtCl_6$ to Pt. The mixture was cooled to room temperature while keeping an $H_2$ atmosphere, and the gas was exchanged for $N_2$ gas, followed by removing the sample quickly. The sample was immediately stored in an airtight container filled with Ar gas. The sample is to be ZTC/Pt-5.8% ($H_2$).

Example 9

ZTC/Pt-5% (h)

Example 9 is an example in which nickel is supported by a gas-phase reduction. The ZTC used for supporting nickel is PFA-2P7(1)-H9(3) prepared by the similar operations to those in Example 4. 100 mg of the ZTC was weighed, followed by drying in vacuum for 2 hours at 120° C. Next, the dried ZTC, and $Ni(NO_3)_2$/ethanol solution obtained by dissolving 24.77 mg of $Ni(NO_3)_2 \cdot 6H_2O$ in 20 ml of ethanol were simply mixed in air. The supported amount is to be 5 wt % if it is assumed that Ni would be all supported on the ZTC. The resultant solution containing ZTC was poured in an airtight container to be subject to an ultrasonic treatment for 10 seconds, followed by stirring for 2 hours by a magnetic stirrer. The obtained mixture was put in a side-arm flask to evaporate ethanol at 120° C. while circulating air by 100 cc per minute. Next, the dried sample was retrieved, and put in a quartz reaction tube (inner diameter of 34 mm), followed by reducing at 375° C. under an $H_2$ atmosphere. The following is a temperature program. First, the temperature was increased from room temperature to 150° C. by 1° C. per minute while circulating $H_2$ (50 cc/min). Then, the temperature was increased from 150° C. to 375° C. by 1.875° C. per minute, followed by keeping for 4 hours. After the treatment at 375° C., atmospheric gas was exchanged for $N_2$, so as to cool to room temperature. After reduction, the sample was retrieved to weigh, followed by storing in a glove box immediately. This sample is to be ZTC/Ni-5% (h).

Comparative Example 1

MSC-30

Comparative Example 1 used MaxSorb (trademark) MSC-30 (BET specific surface area of 2770 m$^2$/g) manufactured by Kansai Coke and Chemicals Company Ltd.

Comparative Example 2

PFA-2P7(1)-H9(3)

In Comparative Example 2, approximately 15 g of powdered zeolite was put in a round-bottom flask, and dried in vacuum for 8 hours at room temperature. Next, the round-bottom flask was immersed in an oil bath and dried in vacuum for 8 hours at 150° C., followed by cooling to room temperature. Next, approximately 400 ml of the FA was poured in the round-bottom flask under a vacuum atmosphere, nitrogen was introduced to the round-bottom flask, followed by returning to atmospheric pressure and stirring for 8 hours under a nitrogen atmosphere, thereby impregnating the micropores of zeolite with the FA. Next, the FA/zeolite composite was extracted from the round-bottom flask, and the FA adhered to an outer surface of the composite was washed by mesitylene and filtered. Next, approximately 15 g of the FA/zeolite composite was put in a quartz reaction tube (inner diameter of 29 mm), and heat-treated for 24 hours at 80° C. while circulating nitrogen. Then, the composite was further heat-treated for 8 hours at 150° C. and the FA in the micropores of zeolite was heated and polymerized, thereby obtaining a PFA/zeolite composite. Next, approximately 0.5 g of the PFA/zeolite composite was put in the quartz reaction tube and heated to 700° C. while circulating nitrogen, so as to carbonize the PFA. Next, propylene (concentration of 2 vol %) was circulated for 1 hour while keeping at 700° C., followed by further filling the micropores of zeolite with carbon. Next, the composite was heated to 900° C. while circulating nitrogen and kept for 3 hours. Next, 0.5 g of the obtained carbon/zeolite composite was poured in 100 ml of 47 wt % of hydrofluoric acid, followed by stirring for 5 hours, so as to dissolve and remove zeolite. Then, the resultant composite was washed and filtered, followed by reducing pressure and dried for 8 hours at 150° C., thereby obtaining MCP(PFA-2P7(1)-H9(3) as a sample) of which a BET specific surface area was approximately 4000 m$^2$/g.

Comparative Example 3

PFA-P7(1)

In Comparative Example 3, NaY zeolite was impregnated with a furfuryl alcohol (FA) to polymerize in micropores of PtY, thereby preparing NaY-PFA in which the micropores were filled with a polyfurfuryl alcohol (PFA). Next, the NaY-PFA was heated under a nitrogen atmosphere to 700° C. Propylene gas was then introduced to the NaY-PFA with a mixture ratio of 7 vol % and CVD was performed for 1 hour. Then, zeolite was dissolved and removed by a hydrofluoric acid treatment, thereby obtaining a microporous carbon material of Comparative Example 3. The obtained MPC is designated by PFA-P7(1) as a sample.

Comparative Example 4

PFA-P8(4)

In Comparative Example 4, similar operations to those in Comparative Example 3 were repeated except that the NaY-PFA was heated to 800° C., and propylene gas was then introduced to the NaY-PFA with a mixture ratio of 7 vol % and CVD was performed for 4 hours, thereby obtaining PFA-P8 (4).

2. Evaluation

With regard to each sample of Examples 1 to 9 and Comparative Examples 1 to 4, Table 1 shows the X-ray diffraction pattern, the supported amount of metal (wt %) calculated by the BET specific surface area and a thermogravimetric (TG) measurement, and the TEM picture.

TABLE 1

| | Sample | Supporting Metal Type | Supporting Amount (wt %) | BET Specific Surface Area (m$^2$/g) | Hydrogen Storage Amount (wt %, 10.5 MPa) | | |
|---|---|---|---|---|---|---|---|
| | | | | | 30° C. | 100° C. | 150° C. |
| Example 1 | PtY—PFA-5P7(0.5)-H9(3) | Pt | 2.0 | 2740 | | | |
| Example 2 | PtY—PFA-7P7(1)-H9(3) | Pt | 2.0 | 2770 | | | |
| Example 3 | PtY—PFA-H7(1)-7P7(1)-H9(3) | Pt | 2.0 | 2850 | | | |
| Example 4 | ZTC/Pt-0.8%(w) | Pt | 0.76 | 3410 | 1.00 | 1.11 | 1.33 |
| Example 5 | ZTC/Pt-4%(w) | Pt | 2.30 | 3590 | 0.98 | | |
| Example 6 | ZTC/Pt-0.8%(e) | Pt | 0.76 | 3480 | | | |
| Example 7 | ZTC/Pt-4%(e) | Pt | 2.30 | 3570 | | | |
| Example 8 | ZTC/Pt-5.8(H$_2$) | Pt | 5.8 | 3260 | | | |
| Example 9 | ZTC/Ni-5%(h) | Ni | 5.0 | 2600 | (0.7 to 0.8) | | 0.48 |
| Comparative Example 1 | MSC-30 | | | 2770 | 0.78 | 055 | 0.48 |
| Comparative Example 2 | PFA-P7(1)-H9(3) | | | 4000 | 0.91 | 0.63 | 0.52 |
| Comparative Example 3 | PFA-P7(1) | | | 2420 | 0.63 | | |
| Comparative Example 4 | PFA-P8(4) | | | 1630 | 0.42 | | |

( )Estimated Value

Figure 2:
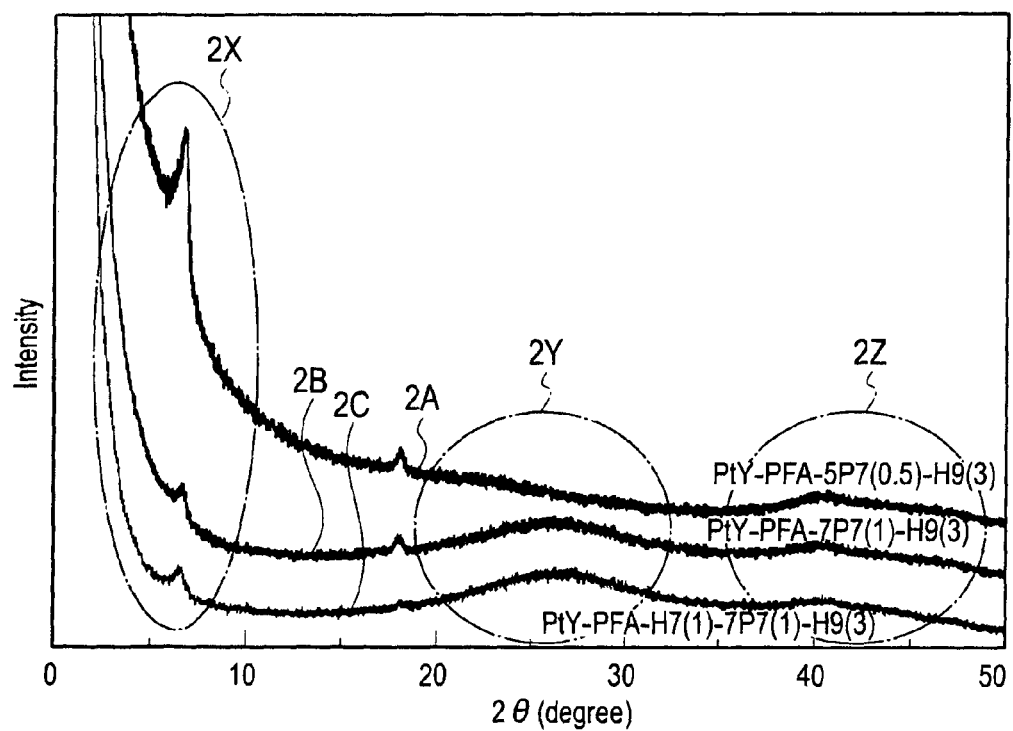
FIG. 2 is a diagram showing X-ray diffraction patterns of platinum-supported zeolite-templated carbon in which platinum-supported zeolite is used as a template.

FIG. 2 shows the X-ray diffraction patterns of platinum-supported zeolite-templated carbon, in which platinum-supported zeolite is prepared as a template. As shown in FIG. 2, the X-ray diffraction pattern of PtY-PFA-5P7(0.5)-H9(3) of Example 1, of which the concentration of propylene is 5 vol % that is low and the CVD time is 0.5 hours that is short, is relatively weak as indicated by 2A compared with the normal MPC X-ray diffraction pattern. However, the X-ray diffraction pattern of Example 1 has a peak approximately at 2θ=6° shown in 2X. In addition, the peak intensity at 2θ=20 to 30° shown in 2Y is low. Therefore, the ordered structure in the MPC is maintained in the sample obtained in Example 1. This indicates that carbon was precipitated on outer surfaces of zeolite particles without depositing in the micropores of zeolite when performing the CVD. The samples obtained in Examples 2 and 3 in which the CVD was performed at 700° C. indicated by 2B and 2C have the X-ray diffraction patterns of which peaks showing the long-range ordered structure approximately at 2θ=6° shown in 2X have low intensity, and of which peaks at 2θ=20 to 30° shown in 2Y are broad derived from a deposition of a carbon net surface. This indicates that a large amount of carbon was precipitated on the outer surfaces of the zeolite particles without depositing in the micropores of zeolite when performing the CVD. It is assumed that this is because platinum-supported zeolite has a higher catalyst ability to carbonize propylene gas than common zeolite, which results in blocking fine pores easily. Accordingly, it is necessary to select synthetic conditions in view of the catalyst ability when platinum-supported zeolite is used as a template. In addition, it is considered that each peak derived from platinum shown in 2Z is small, which means that not all platinum prepared is supported.

Figure 3:
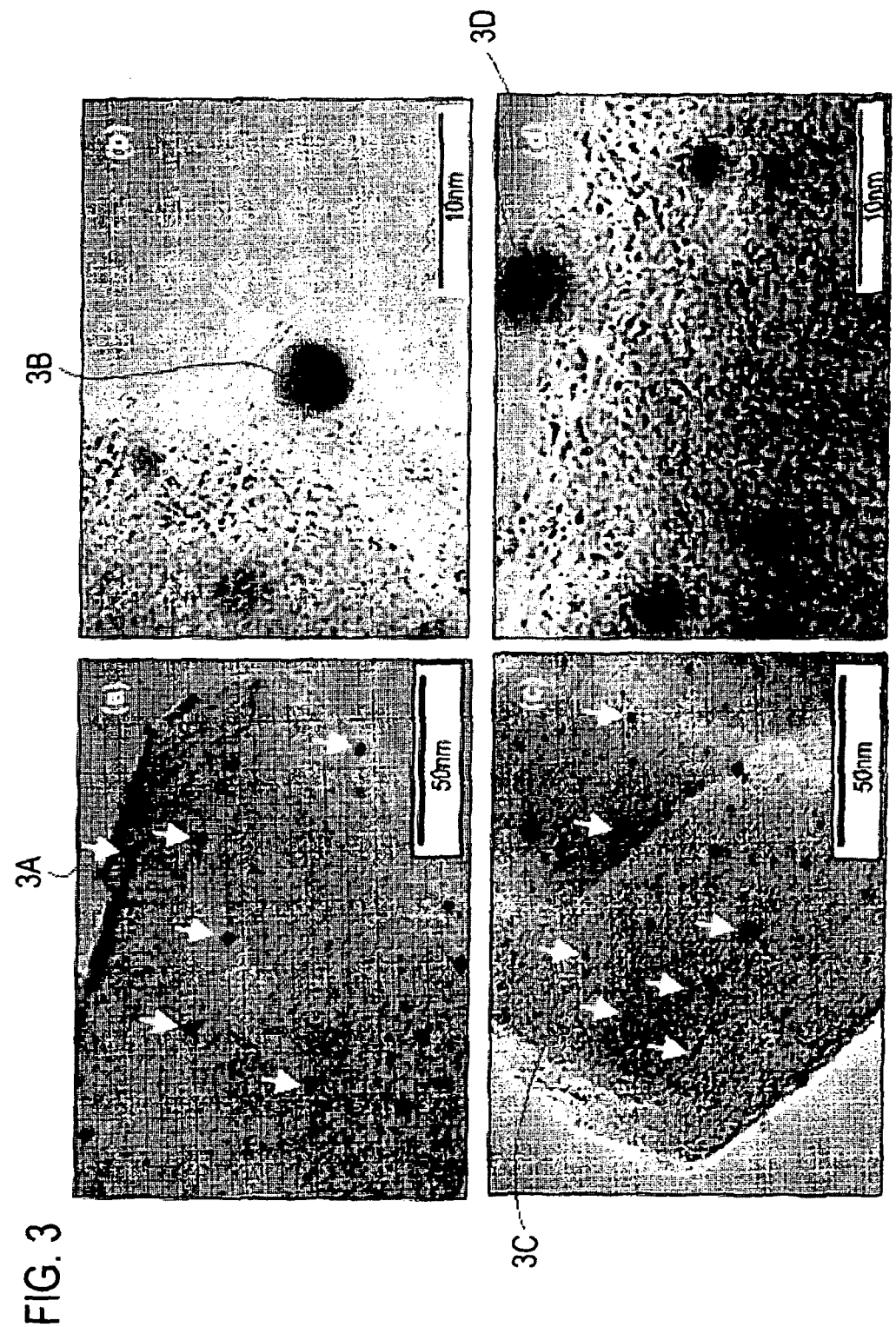
FIG. 3(a) is a view showing a TEM picture of Example 2.
FIG. 3(b) is a view showing a TEM picture of Example 2.
FIG. 3(c) is a view showing a TEM picture of Example 1.
FIG. 3(d) is a view showing a TEM picture of Example 1.

As shown in Table 1, PtY-PFA-5P7(0.5)-H9(3) of Example 1, PtY-PFA-7P7(1)-H9(3) of Example 2, and PtY-PFA-H7(1)-H9(3) of Example 3 all have approximately the same BET specific surface area and supported amount of platinum. However, the respective BET specific surface areas are considerably small compared with the maximum MPC surface area of 4000 m$^2$/g. FIG. 3 shows the TEM pictures of platinum-supported zeolite-templated carbon, in which platinum-supported zeolite is prepared as a template. FIGS. 3(a) and 3(b) show Example 2, and FIGS. 3(c) and 3(d) show Example 1. As shown in FIG. 3, platinum particles indicated by 3A, 3B, 3C and 3D in the TEM pictures of the samples of those examples have quite small particle diameters of approximately 3 nm to 5 nm. Moreover, the platinum particles are widely dispersed. Further, as shown in FIGS. 3(b) and 3(d), platinum particles 3B and 3D seem to be covered with carbon. Such a carbon covering is generated generally at a phase of the CVD. Therefore, it can be considered that the platinum particles were produced due to sintering of platinum species introduced by ion exchange at a phase in which PFA/platinum-supported zeolite was heated to 700° C. Generally, a crystal structure of zeolite is destroyed in any way when sintering occurs. When the structure of zeolite is destroyed, the MPC surface area is reduced in many cases. This can be the reason why the surface area of the platinum-supported MPC is small.

The supported amounts of platinum of the samples of Examples 4 and 5 prepared by the liquid-phase reduction in a aqueous solution were estimated from variation in weight when baking under an air atmosphere. The supported amount of platinum in Example 4 was 2 wt %, and the supported amount of platinum in Example 5 was 6 wt %. The supported amount of platinum is greater than the amount of platinum prepared and added at a raw material phase, which is unreasonable. This can be because the concentration of 4.54 wt % of [Pt(NH$_3$)$_2$(NO$_2$)$_2$]/HNO$_3$ aqueous solution as a raw material of platinum was actually higher, or because zeolite was not removed completely by the hydrofluoric acid treatment, which resulted in a presence of the small amount of residues after melting. Thus, it can be considered that approximately all of Pt(NH$_3$)$_2$(NO$_2$)$_2$ present in the solution were adsorbed in the liquid phase to the MPC when immersing the MPC in the solution A.

The BET specific surface area of the MPC before supporting platinum is approximately 4000 m$^2$/g. Accordingly, the BET specific surface areas when 2 wt % and 6 wt % of nonporous substances are supported are calculated to be 3920 m$^2$/g and 3760 m$^2$/g, respectively. On the other hand, as shown in Table 1, the BET specific surface areas of the samples actually obtained are slightly small. This may be because the structure of the MPC was destroyed slightly because of a reagent such as NaBH$_4$ used in the supporting operation.

Figure 4:
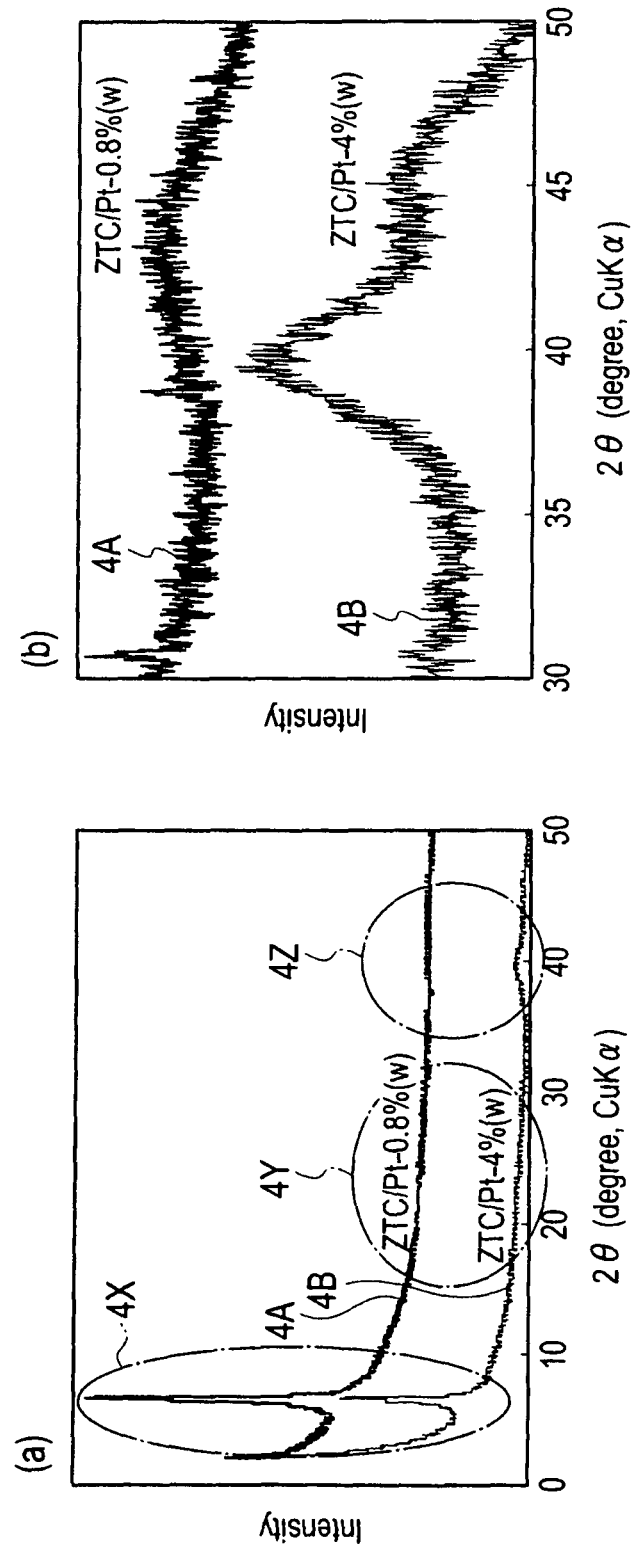
FIG. 4(a) is a diagram showing X-ray diffraction patterns of platinum-supported zeolite-templated carbon prepared by a liquid-phase reduction in an aqueous solution.
FIG. 4(b) is an enlarged sectional diagram of FIG. 4(a).

FIG. 4 shows the X-ray diffraction patterns of the samples obtained in Examples 4 and 5. FIG. 4(a) shows a pattern of the all area, and FIG. 4(b) shows an enlarged sectional diagram of FIG. 4(a). The sample of Example 4 indicated by 4A and the sample of Example 5 indicated by 4B in FIG. 4 show sharp peaks at 2θ=6.4° shown in 4X compared with the samples obtained in Examples 1 to 3 shown in FIG. 2. Meanwhile, each peak intensity at 2θ=20 to 30° shown in 4Y is low. Therefore, it is recognized that the ordered construction of the MPC is maintained in the samples obtained in Examples 4 and 5, respectively. Thus, it can be considered that the method to support platinum on the MPC directly has higher regularity of the MPC than the method to use platinum-supported zeolite as a template. The X-ray diffraction pattern of platinum shows a peak usually at 2θ=40°. Although the peak of the X-ray diffraction pattern obtained in Example 5 at 2θ=40° can be recognized as shown in 4Z, the X-ray diffraction pattern obtained in Example 4 does not show such a peak. The X-ray diffraction pattern obtained in Example 4 shows a broad peak approximately at 2θ=44°. However, this peak is due to carbon (10) diffraction, and such a peak can be also observed in the X-ray diffraction pattern obtained from the MPC without supporting platinum. Accordingly, it can be considered that the X-ray diffraction pattern in Example 4 has a considerably broad diffraction peak since the amount of platinum to be present is low and all of the precipitated platinum particles are significantly small.

Figure 5:
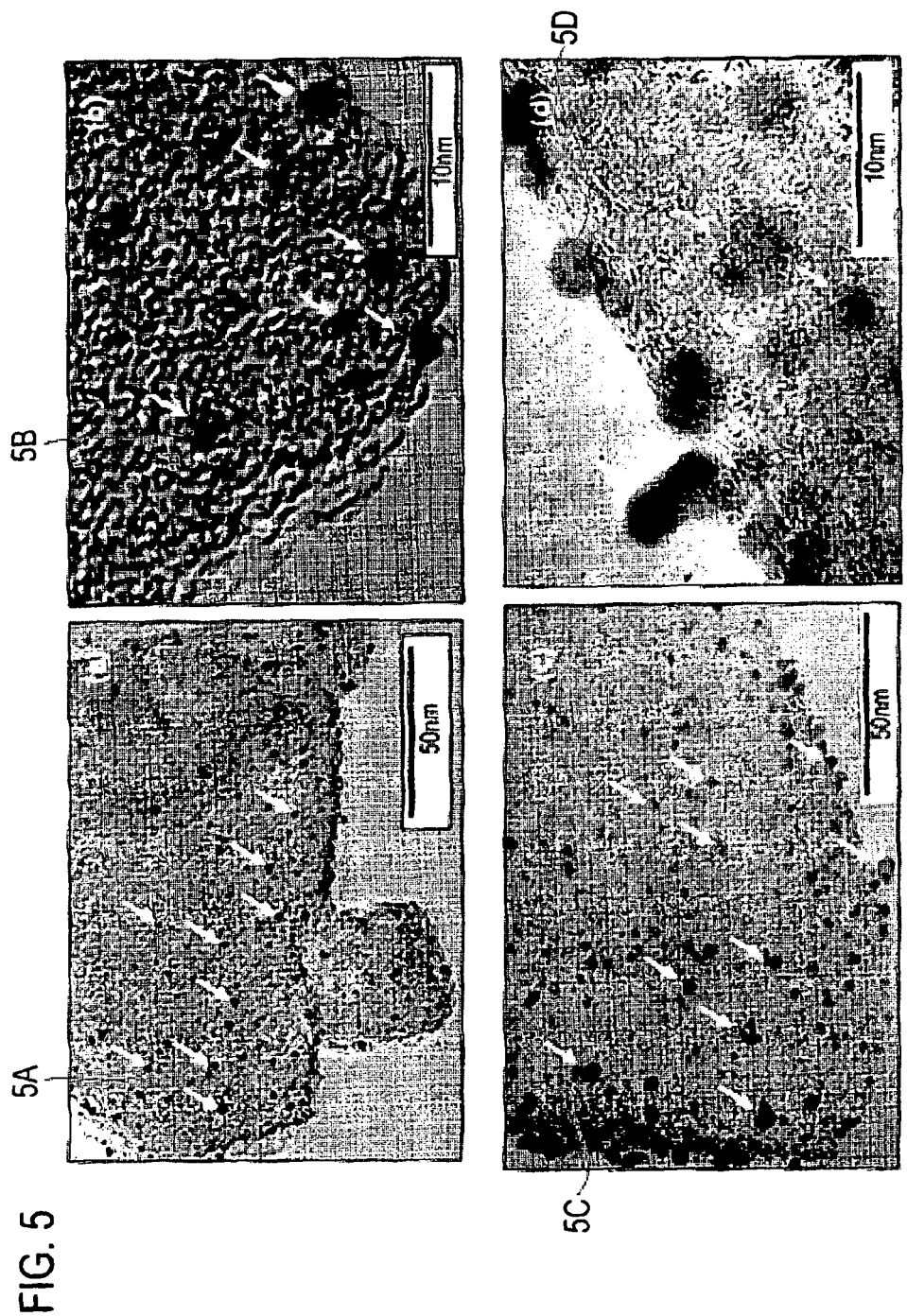
FIG. 5(a) is a view showing a TEM picture of Example 4.
FIG. 5(b) is a view showing a TEM picture of Example 4.
FIG. 5(c) is a view showing a TEM picture of Example 5.
FIG. 5(d) is a view showing a TEM picture of Example 5.

FIG. 5 shows the TEM pictures of Examples 4 and 5. FIGS. 5(a) and 5(b) shows Example 4, and FIGS. 5(c) and 5(d) shows Example 5. As can be seen from FIG. 5, the platinum particles 5A and 5B in Example 4 have quite small diameters within a range from approximately 1 nm to 2 nm. The reason why the platinum particles 5A and 5B are significantly small can be because Pt(NH$_3$)$_2$(NO$_2$)$_2$ was reduced while being adsorbed to the MPC (i.e. while being dispersed widely). On the other hand, platinum particles 5C and 5D in Example 5 have slightly larger diameters, which are within a range from 3 nm to 5 nm. In addition, particularly in Example 5, the platinum particles 5C and 5D seem to be present in large numbers on outer surfaces of the MPC particles. This can be because impregnation using the aqueous solution prevented water from penetrating inside the micropores since the MPC are hydrophobic, and because Pt(NH$_3$)$_2$(NO$_2$)$_2$ was adsorbed mainly adjacent to the outer surface of the MPC and then reduced. Moreover, the platinum particles 5D in Example 5 shown in FIG. 5(d) are not covered with a carbon layer, which is different from Example 1. Thus, it can be considered that the carbon film covering the platinum particles in Example 1 is formed by the CVD.

Figure 6:
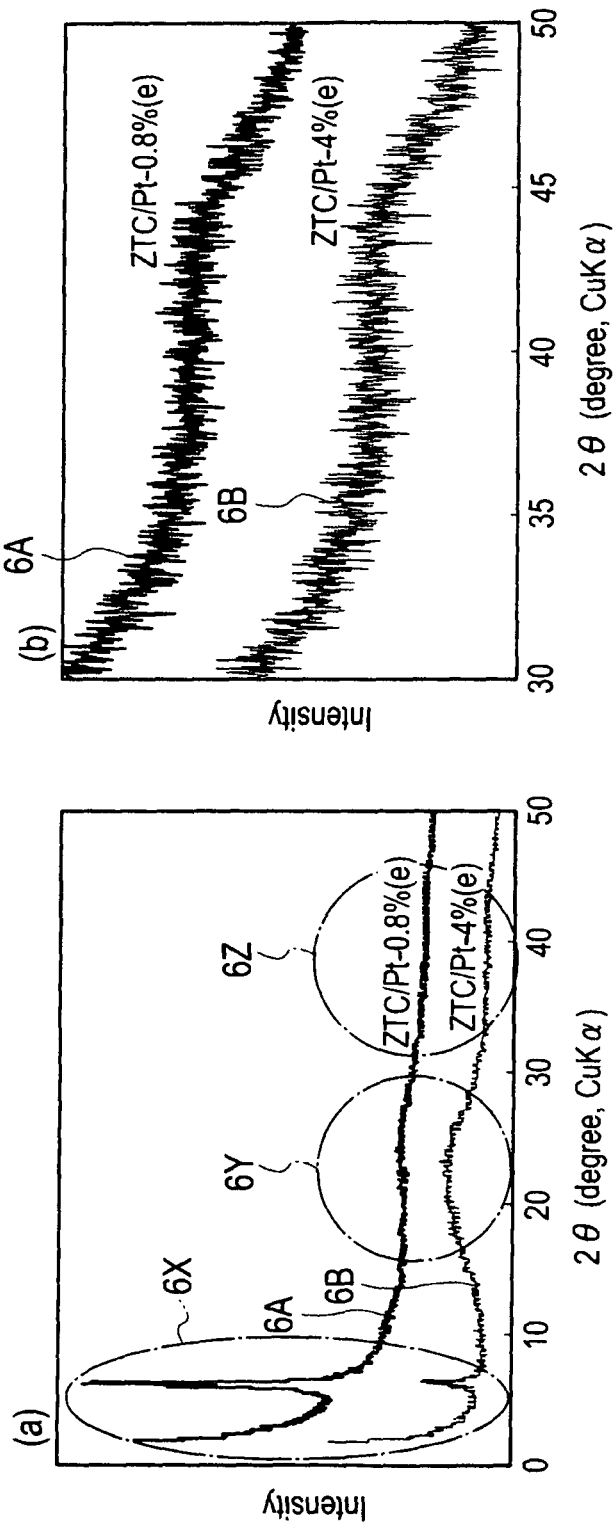
FIG. 6(a) is a diagram showing X-ray diffraction patterns of platinum-supported zeolite-templated carbon prepared by a liquid-phase reduction in an ethanol solution.
FIG. 6(b) is an enlarged sectional diagram of FIG. 6(a).

Next, Examples 6 and 7 in which platinum is supported on the MPC by the liquid-phase reduction in an ethanol solution will be discussed. Reference numeral 6A in FIG. 6 is the X-ray diffraction pattern of Example 6, and reference numeral 6B is the X-ray diffraction pattern of Example 7. FIG. 6(*a*) shows a pattern of the all area, and FIG. 6(*b*) shows an enlarged sectional diagram of FIG. 6(*a*). When platinum is supported by use of the ethanol solution instead of water, platinum can be supported inside the MPC particles since ethanol penetrates inside the MPC particles. What the large difference from the X-ray diffraction pattern of Examples 4 and 5 shown in FIG. 4 is that broad peaks are observed around at $2\theta=26°$ shown in 6Y in addition to peaks shown in 6X. In addition, as shown in 6Z, it is recognized that peak intensity of Example 7 is high, in which the supported amount of platinum is high. This peak can be a carbon (002) diffraction peak due to a stack structure of a graphene sheet.

Figure 7:
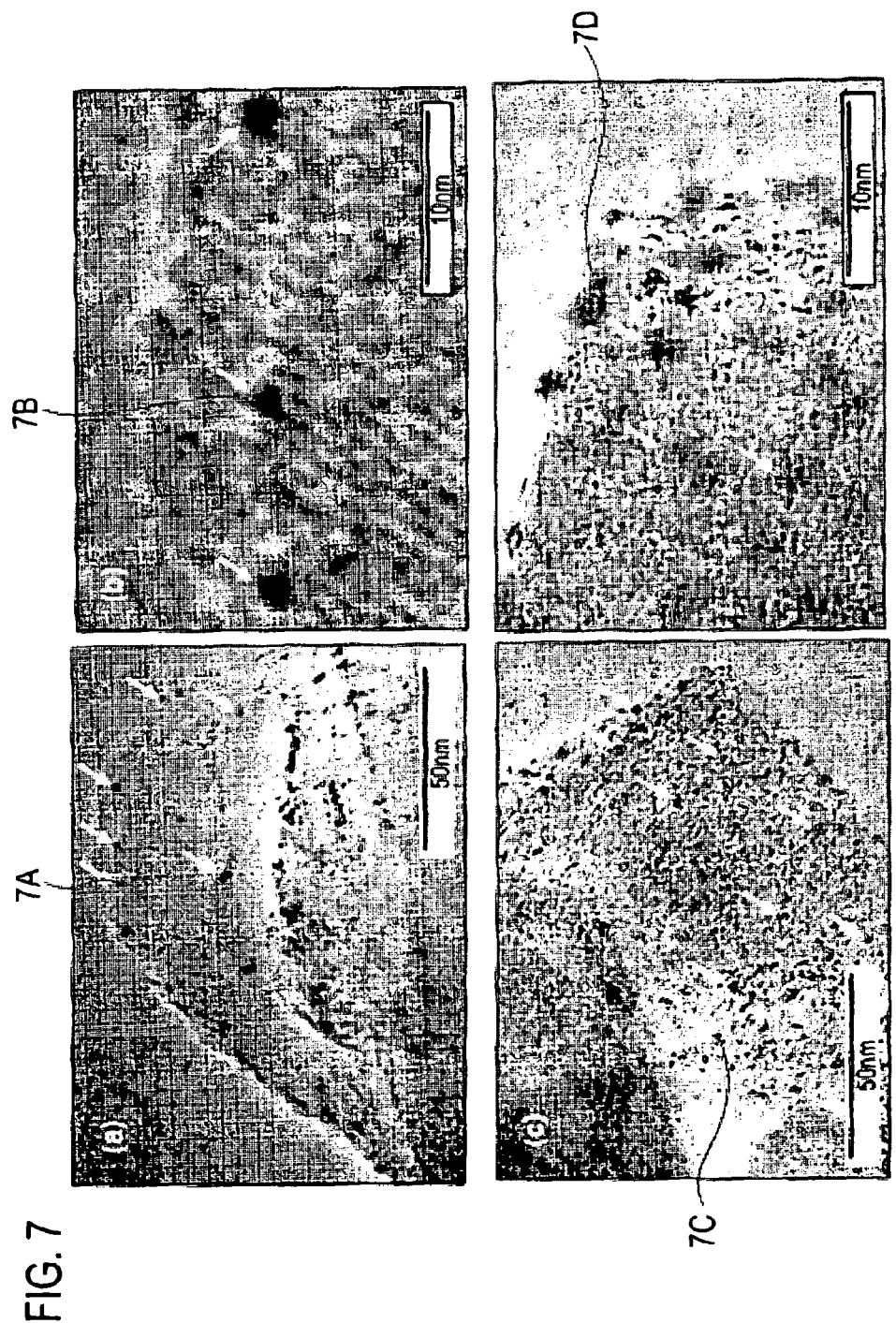
FIG. 7(a) is a view showing a TEM picture of Example 6.
FIG. 7(b) is a view showing a TEM picture of Example 6.
FIG. 7(c) is a view showing a TEM picture of Example 7.
FIG. 7(d) is a view showing a TEM picture of Example 7.

FIG. 7 shows TEM pictures of Examples 6 and 7. FIGS. 7(*a*) and 7(*b*) show Example 6, and FIGS. 7(*c*) and 7(*d*) show Example 7. Platinum particles 7A, 7B, 7C and 7D seem to be present inside the MPC particles, which is different from Examples 4 and 5 shown in FIG. 5. Moreover, particle diameters of the platinum particles 7C and 7D of Example 7 in which the supported amount of platinum is high are within a range from 1 nm to 2 nm, and significantly small. This can be because $Pt(NH_3)_2(NO_2)_2$ penetrated inside the MPC particles due to the use of the ethanol solution, and was adsorbed in the liquid phase uniformly and then reduced. However, the amount of platinum in Examples 6 and 7 seems to be small compared with Examples 4 and 5 shown in FIG. 5. This can be because the observation of the platinum particles was difficult since the particle diameters of the platinum particles 7A, 7B, 7C and 7D were quite small and the platinum particles 7A, 7B, 7C and 7D were present inside the MPC uniformly. Or, this can be because the liquid phase-adsorption amount of $Pt(NH_3)_2(NO_2)_2$ to the MPC was reduced due to ethanol used as a solvent, and the supported amount of platinum was reduced. In order to determine which the former or the latter to be the reason, it is necessary to measure the supported amount of platinum by a thermogravimetric measuring system. In any cases, the platinum particles with a large particle diameter are not present in Examples 6 and 7. Accordingly, the peak derived from platinum in 6Z is not observed in the X-ray diffraction pattern shown in FIG. 6.

As shown in FIG. 6(*a*), the X-ray diffraction pattern 6B of Example 7 shows the large peak derived from carbon (002). However, the peak strength of carbon (10) is approximately the same as that of Example 6 as shown in FIG. 6(*b*). Namely, while the stack structure of carbon is present in Example 7 more than Example 6, an expansion La of the graphene sheet in Example 7 is approximately the same as Example 6. This can be because the MPC structure was destroyed because the platinum particles were produced inside the MPC particles, so that the stack structure of the graphene sheet was partly formed. As shown in Table 1, the BET specific surface area of Example 6 is 3410 $m^2$/g. This can be also because the MPC structure was destroyed due to the production of the platinum particles.

Figure 8:
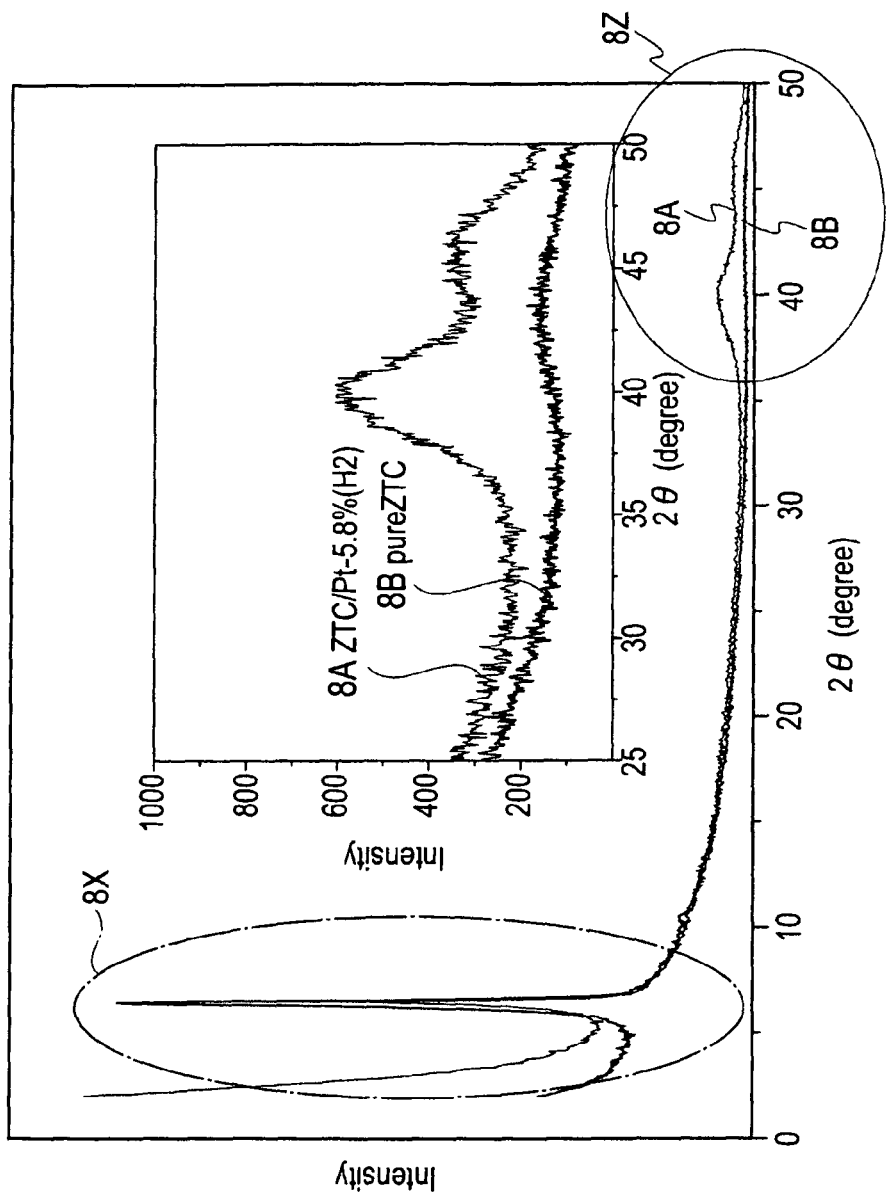
FIG. 8 is a diagram showing X-ray diffraction patterns of platinum-supported zeolite-templated carbon prepared by a gas-phase reduction.

Next, Example 8 in which platinum is supported on the MPC by the gas-phase reduction will be explained. FIG. 8 shows an XRD pattern of Example 8 prepared by the gas-phase reduction. A sharp peak at $2\theta=6.4°$ shown in 8X is derived from the long-range ordered structure that is specific to zeolite-templated carbon. Compared with zeolite-templated carbon without supporting platinum shown in 8B, Example 8 shows a weak and broad peak of carbon (10) at $2\theta=44°$ shown in 8Z. Since the peak of platinum is shown at $2\theta=40°$, the peak of platinum is partially overlapped with the broad peak of carbon (10). It is indicated that Examples 4 to 7 prepared by the liquid-phase reduction all had the significantly weak peaks and the supported amount of platinum was small. On the other hand, the peak of platinum was clearly observed in Example 8 prepared by the gas-phase reduction. It is considered that a level of the peak strength of platinum by the XRD reflects the amount of platinum practically included in each sample.

Figure 9:
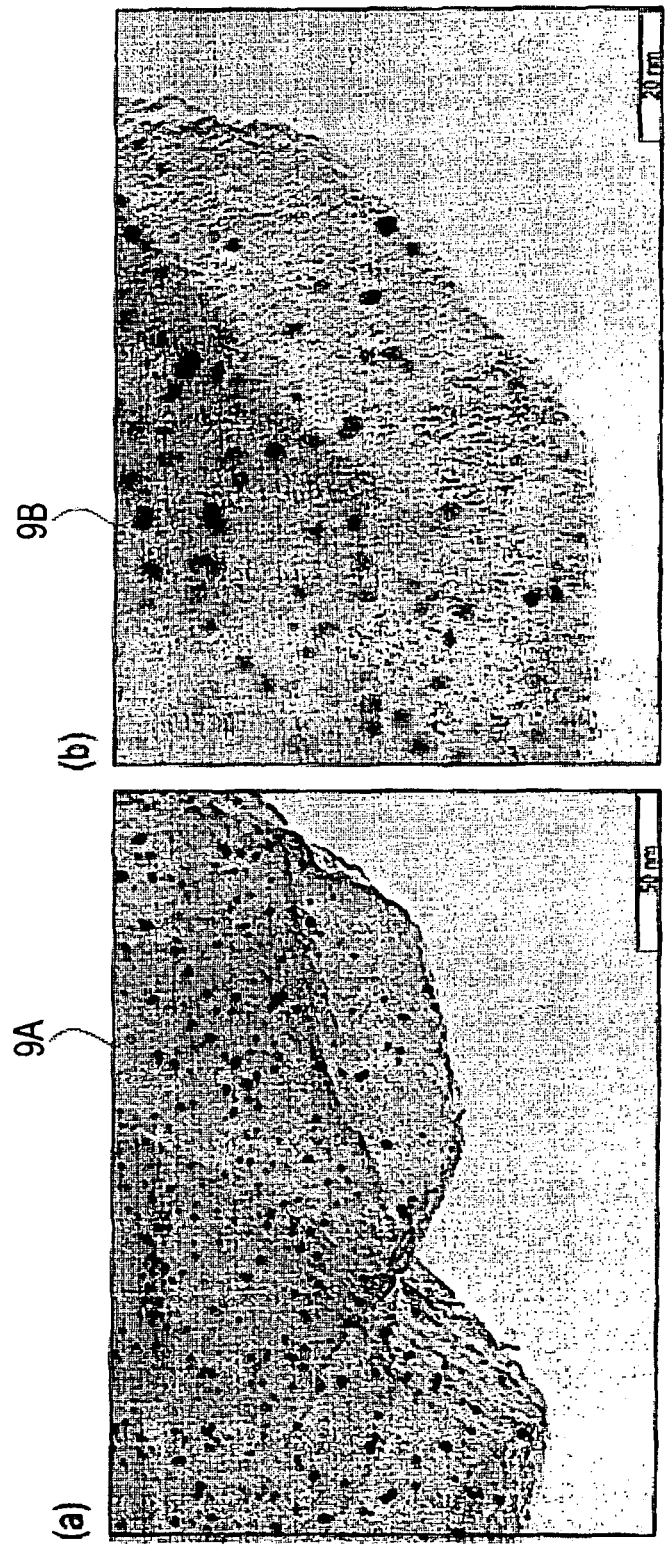
FIG. 9(a) is a view showing a TEM picture of Example 8 prepared by a gas-phase reduction under a hydrogen atmosphere.
FIG. 9(b) is a view showing a TEM picture of Example 8 prepared by a gas-phase reduction under a hydrogen atmosphere.

FIG. 9 shows TEM pictures of Example 8 prepared by the gas-phase reduction under a hydrogen atmosphere. It is observed that nanoparticles 9A and 9B that might be platinum were also highly dispersed in the sample of Example 8. The size of the nanoparticles 9A and 9B was 5 nm or less.

Figure 10:
FIG. 10(a) is a view showing a TEM picture of nickel-supported zeolite-templated carbon of Example 9 prepared by a gas-phase reduction.
FIG. 10(b) is a view showing a TEM picture of Example 9.
FIG. 10(c) is a view showing a TEM image of Example 9 taken in a selected area.
FIG. 10(d) is a sectional view of an electron diffraction image taken in the selected area of FIG. 10(c).
Figure 10:
Figure 10:
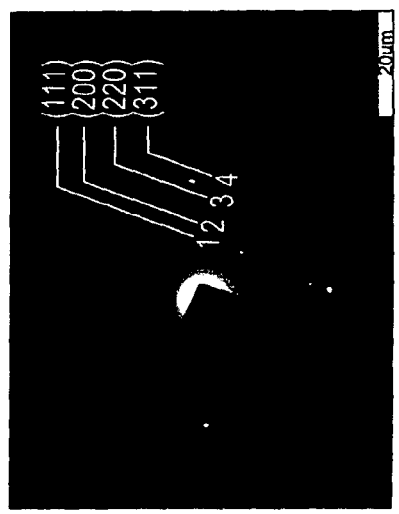
Figure 10:
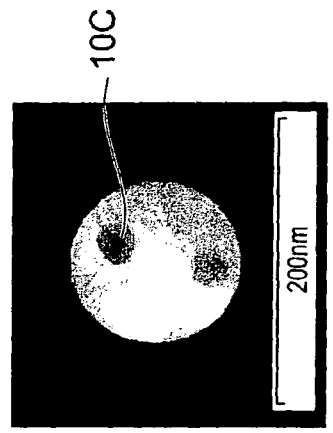

Example 9 in which nickel is supported by the hydrogen gas-phase reduction will be explained. FIGS. 10(*a*) and 10(*b*) show TEM pictures of Ni-supported ZTC. As indicated by 10A and 10B in FIGS. 10(*a*) and 10(*b*), black particles that may be Ni with a particle diameter of approximately 20 nm to 30 nm are uniformly dispersed. FIG. 10(*c*) shows a TEM image taken in a selected area, and FIG. 10(*d*) shows a selected area electron diffraction image of a section indicated by reference numeral 10C in FIG. 10(*c*). Four spots in FIG. 10(*d*) are present concentrically. It is confirmed that each d value of the concentric circles corresponds to surfaces of Miller indices (111), (200), (220) and (311) of Ni radially from the center. According to the result of the XRD shown in FIG. 11. Ni species (oxide and hydroxide) other than Ni metal were not found at all. Thus, it can be recognized that the all black particles observed in FIG. 10 are Ni metal nanoparticles.

Figure 11:
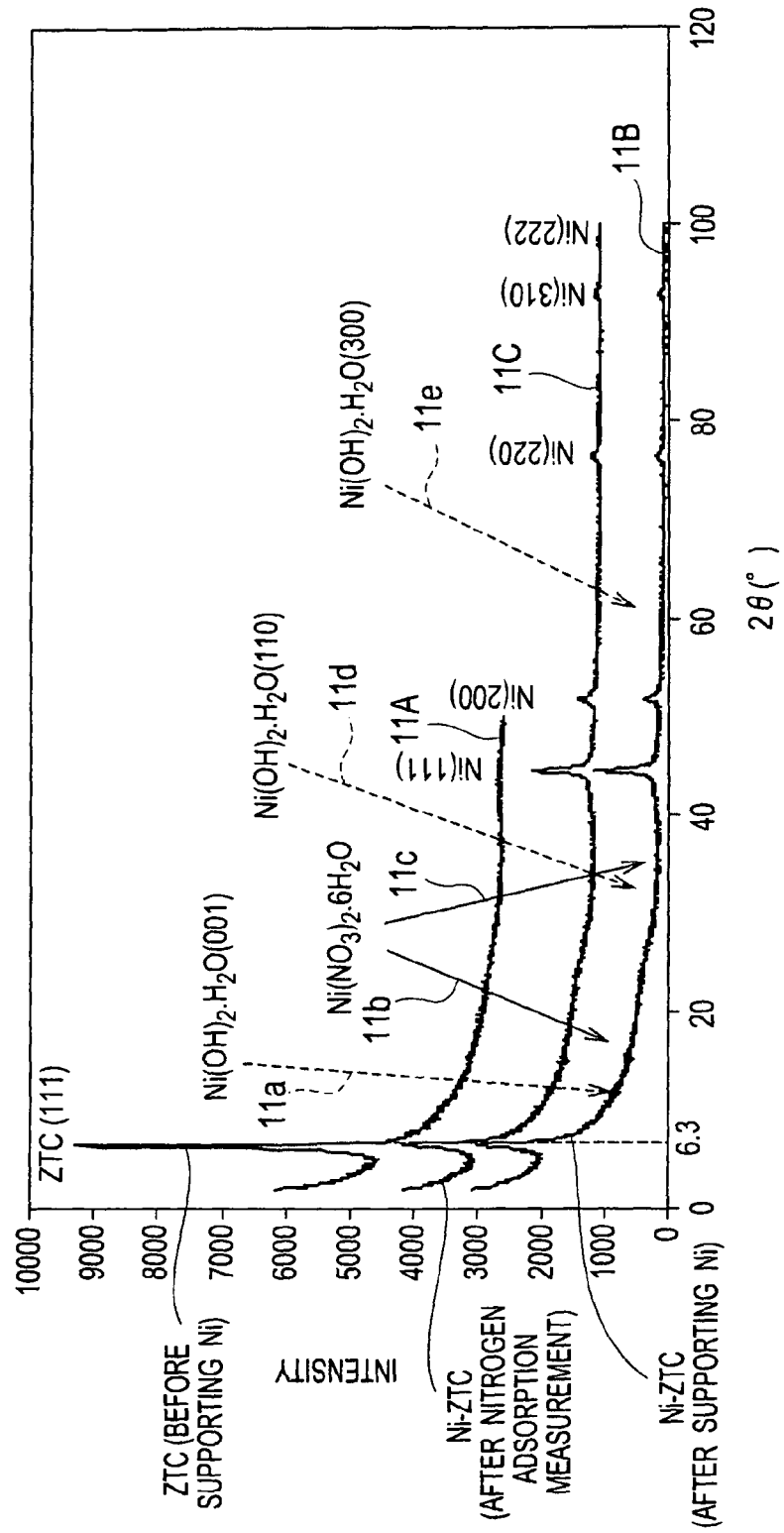
FIG. 11 is a diagram showing X-ray diffraction patterns of nickel-supported zeolite-templated carbon prepared by a gas-phase reduction.

FIG. 11 shows XRD patterns of ZTC before and after supporting Ni. The XRD pattern before supporting Ni indicated by reference numeral 11A shows a sharp peak approximately at $2\theta=6.3°$. This peak is derived from an ordered structure of (111) of the zeolite template transcribed into carbon, and shows a high ordered structure of ZTC. The XRD pattern after supporting Ni indicated by reference numeral 11B shows lower peak intensity at $2\theta=6.3°$. This is because a framework structure of ZTC with low heat resistance was slightly destroyed since the sample was heated at 375° C. during the operation to support Ni. In terms of a higher degree area, Ni-supported ZTC shows a significant peak of Ni metal. For the purpose of reference, other peaks derived from Ni compounds other than Ni metal are indicated by reference numerals 11a to 11e in FIG. 11. Meanwhile, such peaks were not detected in Ni-supported ZTC indicated by reference numeral 11B at all. According to the results of TEM and XRD shown in FIGS. 10 and 11, it is obvious that Ni metal with a particle diameter of 20 nm to 30 nm could be supported on ZTC by this supporting operation.

In addition, Ni-supported ZTC was dried in vacuum for 6 hours at 150° C., followed by performing a nitrogen adsorption-desorption measurement. In order to observe whether there were any structural changes due to such a vacuum heating treatment, the XRD pattern of Ni-supported ZTC after the nitrogen adsorption-desorption measurement was measured. The XRD pattern is indicated by reference numeral 11C in FIG. 11. Any change was not found with regard to the peaks before and after the nitrogen adsorption-desorption measurement. Moreover, $N_2$ adsorption-desorption properties were measured in order to calculate a specific surface area of ZTC before and after supporting Ni. As a result, the surface area of ZTC before supporting Ni was 4000 $m^2$/g. Meanwhile, the surface area of ZTC after supporting Ni was reduced to 2600 $m^2$/g. The surface area should be 3838 $m^2$/g if only 5 wt % of Ni metal is added to ZTC. However, the surface area of Ni-supported ZTC was much lower than the expected value. This can be because, as can be seen in the XRD pattern, the structure of ZTC was slightly destroyed due to the heat treatment at 375° C.

[Evaluation of Hydrogen Storage Ability]

With respect to the typical samples of Examples and Comparative Examples, pressure-composition isotherm (PCT curve) was measured according to Sieverts law (volume method, Japanese industrial standard JIS H 7201). The hydrogen storage ability was measured by use of compressibility factor regulated at National Institute of Standards and Technology: NIST). An accuracy of measurement depends on the filled amount of the samples. At least 1 g or more of each sample was filled, the above-described synthetic scheme was repeated as necessary, and the required amount was prepared. The samples were weighed to put into a pressure-resistant sampling tube for measurement, subject to vacuuming for 4 hours at 100° C. to release gas left in the sampling tube, and measured after obtaining original points in which hydrogen was not adsorbed. The measurement temperatures were 30° C., 100° C. and 150° C. Then, pressure was reduced to atmospheric pressure and the desorbed amount of hydrogen was confirmed. The results of measurement are shown in FIGS. 12 to 21.

Figure 12:
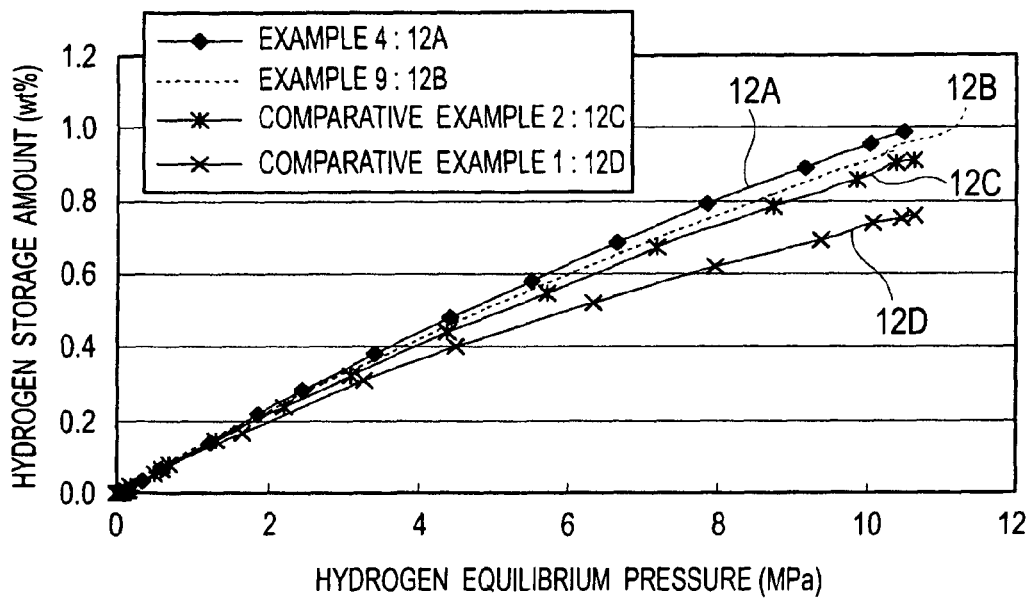
FIG. 12 is a graph showing a hydrogen storage amount of each sample of Examples 4 and 9 and Comparative Examples 1 and 2.
Figure 13:
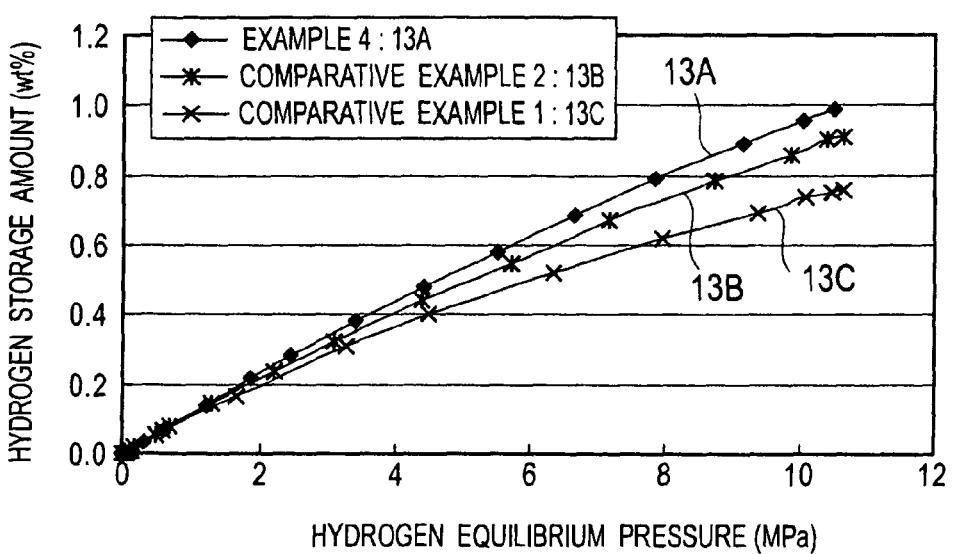
FIG. 13 is a graph showing a hydrogen storage amount at a low-pressure side of each sample of Examples 4 and 9 and Comparative Example 2.

FIG. 12 shows the hydrogen storage amounts (PCT curves) of Example 4 indicated by reference numeral 12A, Example 9 indicated by reference numeral 12B, Comparative Example 2 indicated by reference numeral 12C and Comparative Example 1 indicated by reference numeral 12D. FIG. 13 shows the hydrogen storage amount at a low-pressure side in FIG. 12. As shown in FIG. 12, the hydrogen storage amounts at hydrogen equilibrium pressure of 10.5 MPa were 1.0 wt % in Example 4, 0.91 wt % in Comparative Example 2, and 0.78 wt % in Comparative Example 1, respectively. In addition, Example 4 on which platinum was supported had the most favorable hydrogen storage ability higher than Comparative Examples 1 and 2 on which platinum was not supported. Accordingly, Example 4 could obtain metal supporting effects due to platinum. Moreover, as shown in FIG. 13, Example 9 indicated by reference numeral 13B on which nickel was supported had the lower hydrogen storage ability than Example 4 indicated by reference numeral 13A at the low-pressure side, but higher than Comparative Example 2 indicated by reference numeral 13C. According to the result in FIG. 13, it is assumed that Example 9 on which nickel was supported showed a behavior indicated by a doted line of 12B in FIG. 12 at a high-pressure side, could obtain the high hydrogen storage ability although it was lower than Example 4, and could obtain 10 to 20% of metal supporting effects due to nickel even in a high-pressure range.

Figure 14:
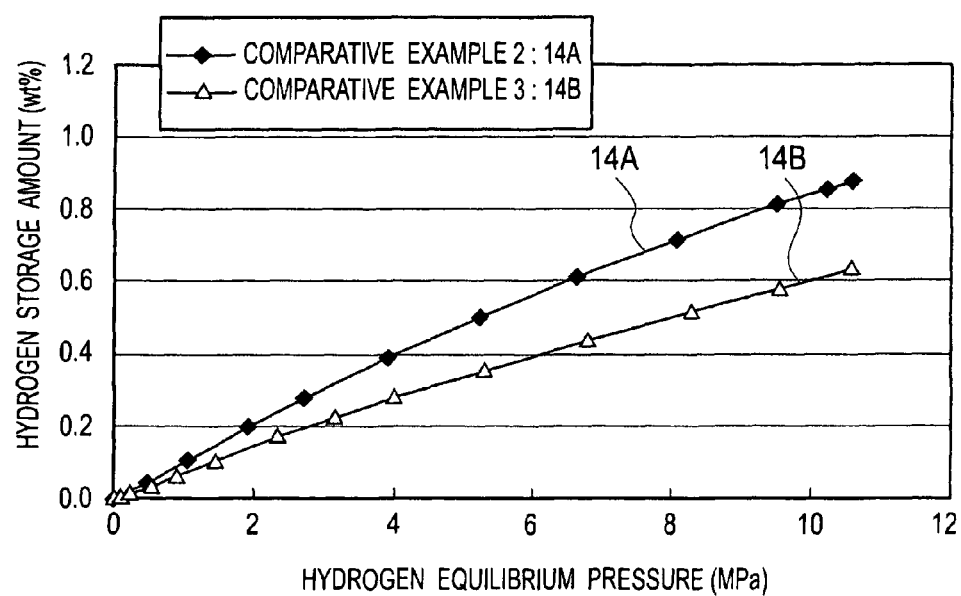
FIG. 14 is a graph showing a hydrogen storage amount of each sample of Comparative Examples 2 and 3.
Figure 15:
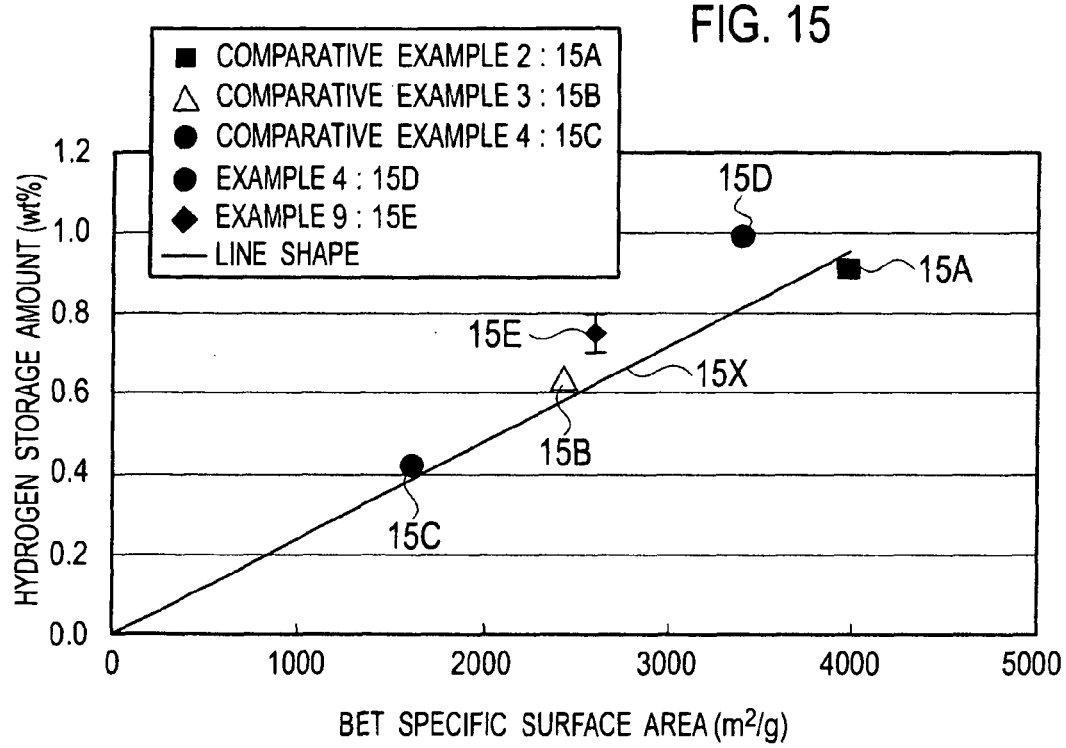
FIG. 15 is a graph showing a relationship between a BET specific surface area and a hydrogen storage amount of each sample of Examples 4 and 9 and Comparative Examples 2 to 4.

FIG. 14 shows the hydrogen storage ability of Comparative Example 2 indicated by reference numeral 14A and Comparative Example 3 indicated by reference numeral 14B, which are the samples before supporting platinum. FIG. 15 is a diagram on which a relationship between the BET specific surface area and the hydrogen storage ability of Comparative Example 2 indicated by reference numeral 15A, Comparative Example 3 indicated by reference numeral 15B, Comparative Example 4 indicated by reference numeral 15C, Example 4 indicated by reference numeral 15D on which platinum was supported, and Example 9 indicated by reference numeral 15E on which nickel was supported is plotted. As shown in FIG. 15, Comparative Examples 2, 3 and 4 on which platinum was not supported have an approximately linear relationship between the BET specific surface area and the hydrogen storage ability. In Example 4 on which platinum was supported and Example 9 on which nickel was supported, the hydrogen storage amounts are plotted in the figure on much higher positions than a line (reference numeral 15X) of Comparative Examples 2 to 4. Accordingly, it is recognized that Examples 4 and 9 have a hydrogen storage mechanism (hydrogen dissociative adsorption such as spillover due to transition metal represented by platinum and nickel) that functions differently from conventional cases. In addition, it is considered that approximately 40% of the hydrogen storage ability in Example 4 was improved, and 20 to 25% in Example 9 was improved in view of the linear relationship obtained by plotting the samples having the same surface area and not supporting platinum.

Figure 16:
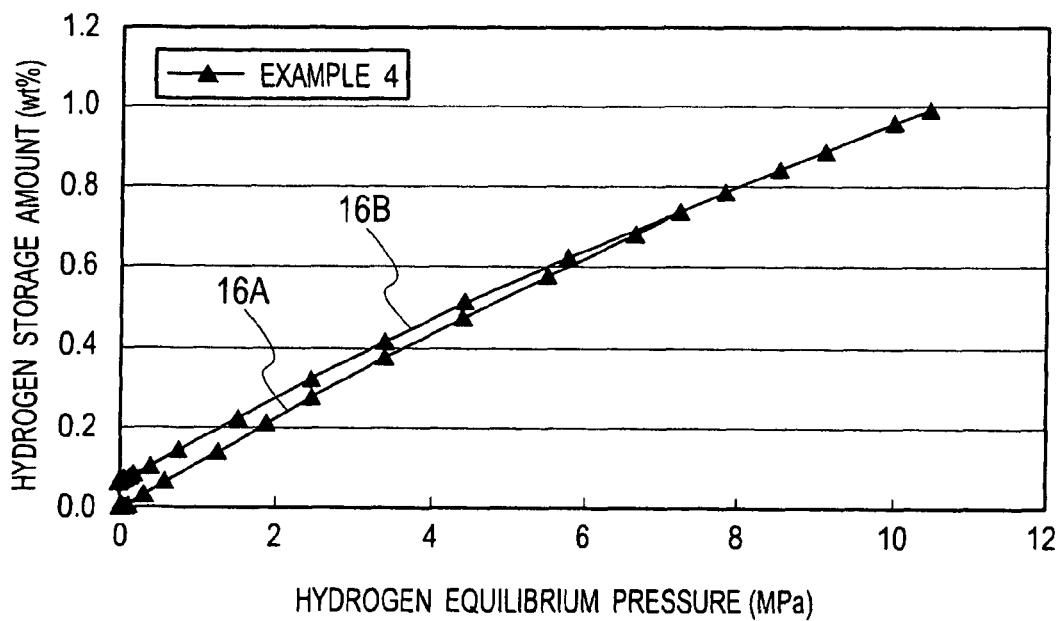
FIG. 16 is a graph showing a hydrogen adsorption-desorption amount of Example 4.

FIG. 16 shows a hydrogen adsorption-desorption ability of Example 4 at 30° C. Reference numeral 16A shows a hydrogen adsorption curve of Example 4, and reference numeral 16B shows a hydrogen desorption curve of Example 4. As shown in FIG. 16, although Example 4 slightly showed hysteresis characteristics, Example 4 desorbed hydrogen immediately with a drop of hydrogen equilibrium pressure. In addition, the residual hydrogen storage amount at hydrogen equilibrium pressure of 0.1 MPa was 0.1 wt %. Moreover, Example 4 obtained 90% of the effective hydrogen storage amount that could be actually extracted. Thus, it is confirmed that the sample of Example 4 demonstrated practical performance as a hydrogen storage material.

Figure 17:
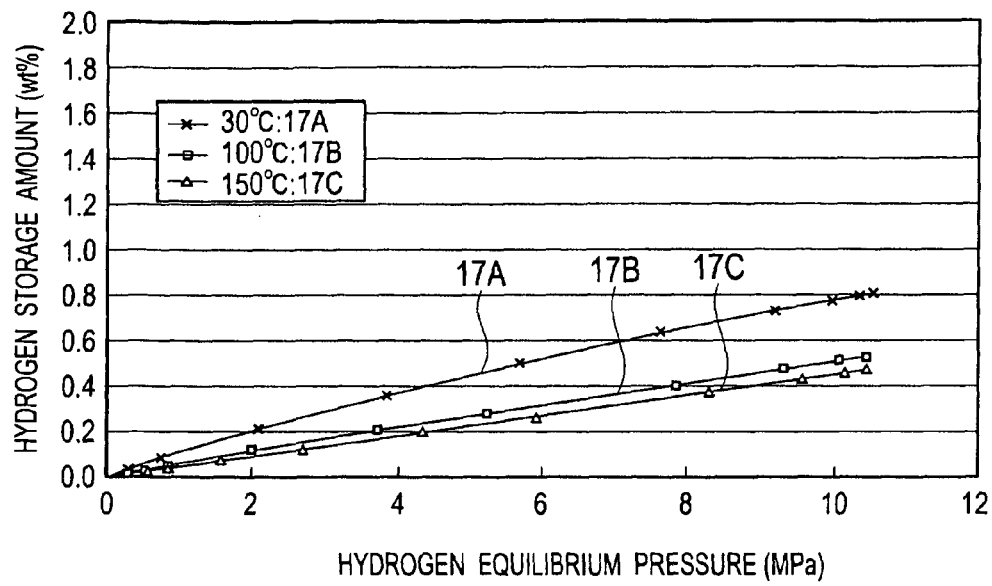
FIG. 17 is a graph showing a temperature dependence of a hydrogen storage amount of Comparative Example 1.
Figure 18:
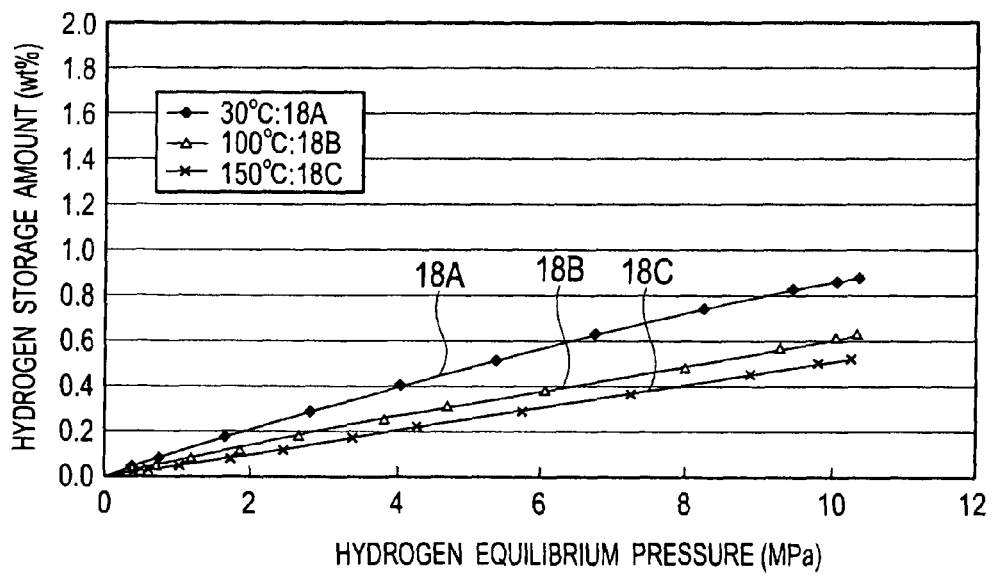
FIG. 18 is a graph showing a temperature dependence of a hydrogen storage amount of Comparative Example 2.
Figure 19:
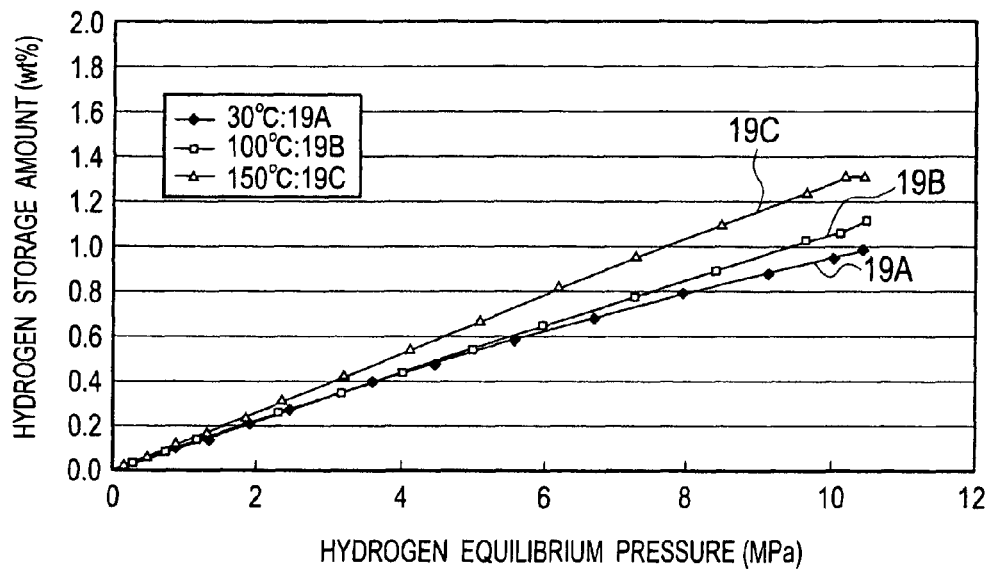
FIG. 19 is a graph showing a temperature dependence of a hydrogen storage amount of Example 4.

FIG. 17 shows Comparative Example 1, FIG. 18 shows Comparative Example 2, and FIG. 19 shows Example 4, in which each figure shows a temperature dependence of the hydrogen storage ability of each example. As shown in FIGS. 17 and 18, the hydrogen storage ability at 10.5 MPa was lowered with an increase of temperature in Comparative Examples 1 and 2 on which metal was not supported. For example, in FIG. 17, the hydrogen storage ability indicated by reference numeral 17A at 30° C. was 0.78 wt %, which was the highest. The hydrogen storage ability indicated by reference numeral 17B at 100° C. was 0.55 wt %, which was the second highest. The hydrogen storage ability indicated by reference numeral 17C at 150° C. was 0.48 wt %, which was the lowest. Similarly, in FIG. 18, the hydrogen storage ability indicated by reference numeral 18A at 30° C. was 0.91 wt %, which was the highest. The hydrogen storage ability indicated by reference numeral 18B at 100° C. was 0.63 wt %, which was the second highest. The hydrogen storage ability indicated by reference numeral 18C at 150° C. was 0.52 wt %, which was the lowest. On the other hand, in Example 4 shown in FIG. 19, the hydrogen storage ability indicated by reference numeral 19A at 30° C. was 1.00 wt %, which was the lowest. The hydrogen storage ability indicated by reference numeral 19B at 100° C. was 1.11 wt %, which was the second lowest. The hydrogen storage ability indicated by reference numeral 19C at 150° C. was 1.33 wt %, which was the highest. Accordingly, it is confirmed that the hydrogen storage ability improved as temperature increased. This means that the hydrogen adsorbing mechanism varies by supporting transition metal.

There are many advantages practically when the storage ability improves as temperature increases. Temperature increases due to adiabatic compression when hydrogen is filled. The more rapidly hydrogen is filled, the more temperature of the material or a housing filled with the material increases. With regard to the material of which the storage ability is reduced in accordance with the increase of temperature, the actual hydrogen filled amount is reduced. However, by using the material according to the present invention in which the storage ability improves as temperature increases, the conventional problem can be solved.

Figure 20:
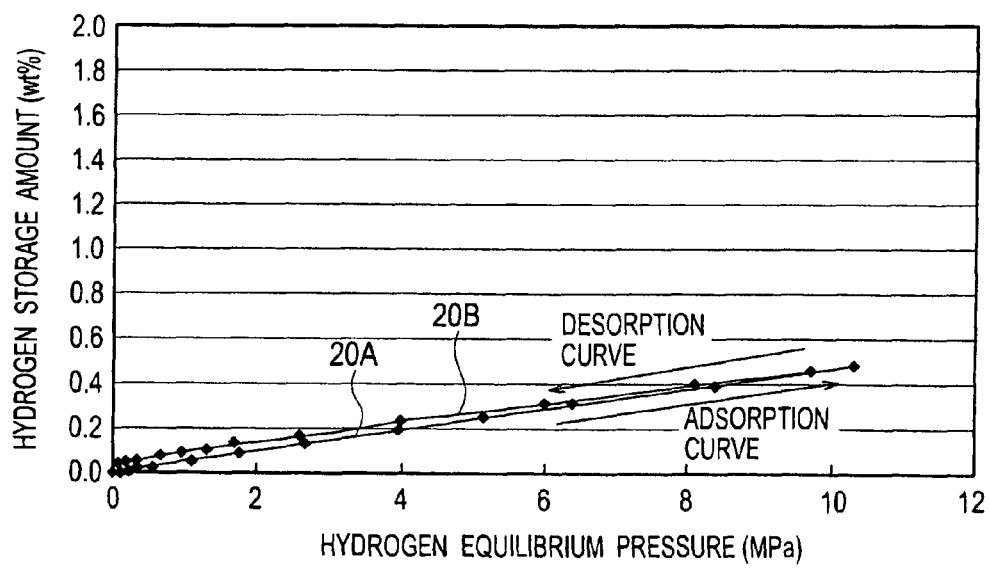
FIG. 20 is a graph showing hydrogen adsorption-desorption curves at 150° C. of Comparative Example 1.
Figure 21:
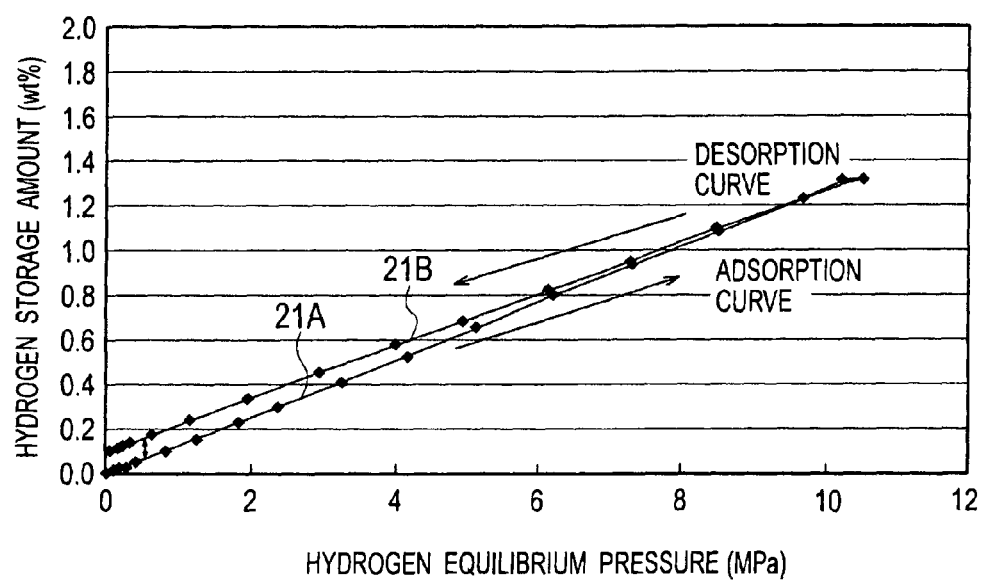
FIG. 21 is a graph showing hydrogen adsorption-desorption curves at 150° C. of Example 4.

FIG. 20 shows the hydrogen adsorption-desorption curve of Comparative Example 1 at 150° C., and FIG. 21 shows the hydrogen adsorption-desorption curve of Example 4 at 150° C. Reference numeral 20A shows the hydrogen adsorption carve of Comparative Example 1, and reference numeral 20B shows the hydrogen desorption curve of Comparative Example 1. As shown in FIG. 20, although Comparative Example 1 slightly showed hysteresis characteristics, Comparative Example 1 desorbed hydrogen immediately with a drop of hydrogen equilibrium pressure. In addition, the residual hydrogen storage amount at hydrogen equilibrium pressure of 0.1 MPa was 0.1 wt % or less. Moreover, Comparative Example 1 obtained 90% of the effective hydrogen storage amount that could be actually extracted. Reference numeral 21A shows the hydrogen adsorption carve of Example 4, and reference numeral 21B shows the hydrogen desorption curve of Example 4. As shown in FIG. 21, although Example 4 also showed hysteresis characteristics slightly, Example 4 desorbed hydrogen immediately with a drop of hydrogen equilibrium pressure. In addition, the residual hydrogen storage amount at hydrogen equilibrium pressure of 0.1 MPa was 0.1 wt %. Moreover, Example 4 obtained 90% of the effective hydrogen storage amount that could be actually extracted. It is confirmed that Example 4 could desorb 90% or more of full-filled hydrogen when reducing pressure even under a relatively severe circumstance of 150° C. similar to Comparative Example 1, and could adsorb and desorb hydrogen stably without lowering the storage ability after repeating filling and releasing about 10 times. Accordingly, it is confirmed that the sample of Example 4 demonstrated practical performance as a hydrogen storage material even at high temperature.

According to the present invention, the microporous carbon material includes the three-dimensional long-range ordered structure within a range from 0.7 nm or more to 2 nm or less, and the micropores. It is recognized that the microporous carbon material in which the transition metal is supported on the surfaces of the micropores can express the functions that supported metal has while maintaining the pore functions inherently included. Although Example 4 is an example in which platinum is used, it is possible to support other metal by use of the same process. Meanwhile, Example 9 uses nickel. As for acetylacetone salt, titanium, vanadium, chromium, manganese, iron, cobalt, nickel, copper, zirconium, molybdenum, ruthenium, rhodium, palladium, and lanthanoid series are available commercially. Therefore, any one of the above-mentioned metal can be used instead of nickel acetylacetone so as to be supported, without limiting to nickel.

The entire contents of Japanese Patent Application No. P2008-045069 (filed on Feb. 26, 2008), Japanese Patent Application No. P2008-268753 (filed on Oct. 17, 2008), and Japanese Patent Application No. P2009-040932 (filed on Feb. 24, 2009) are herein incorporated by reference.

Although the invention has been described above by reference to the embodiment and examples of the invention, the invention is not limited to the embodiment and examples described above, and modifications may become apparent to these skilled in the art, in light of the teachings herein.

Industrial Applicability

The microporous carbon material according to the present invention can be used as a material to adsorb gas used as a fuel represented by hydrogen and methane. In addition, the microporous carbon material can be applied to a matrix that is a new composite material, an electroconductive material and a carbon film, and an electrode material such as a capacitor, a lithium ion battery that is a device to convert electrical energy to chemical energy so as to store, and a fuel cell. Moreover, the microporous carbon material according to the present invention demonstrates excellent electrical characteristics. Therefore, it is possible to increase options for a variety of industrial material selectivity, and improve product performance dramatically, for example. Specifically, when the microporous carbon material is used in an electric double-layer capacitor as an electrode material, the microporous carbon material can show properties realizing high power density and rapid charge and discharge, and show a long-life property. By using the microporous carbon material according to the present invention, it is possible to produce a battery or an electric double-layer capacitor excellent in capacity, heavy load performance, and cycle performance. Accordingly, the microporous carbon material according to the present invention enables an electronic component/device, a transport device, an electric device, an electric power unit, and the like to be highly-functional, and is further excellent in downsizing, reduction in weight, and portability of devices and elements.

REFERENCE SIGNS LIST

1 Zeolite (Porous material)
1a Micropore
2 Zeolite carbon
3 Composite
4 Transition metal
5 Microporous carbon material

The invention claimed is:

1. A hydrogen storage material comprising:
a microporous carbon material which adsorbs and desorbs hydrogen and has a three-dimensional long-range ordered structure comprising carbon chains that are three-dimensionally and regularly repeated in a long-range with a distance between 0.7 nm and 2 nm,
wherein, in the microporous carbon material, micropores having a diameter within a range from 0.1 nm to 2 nm are connected to each other,
wherein a transition metal having a concentration between 0.05 and 6 wt % is supported on surfaces of the micropores, and
wherein, when the microporous carbon material supports the transition metal, a BET specific surface area of the microporous carbon material is 3000 $cm^2/g$ or more.

2. The hydrogen storage material according to claim 1, wherein the transition metal is platinum.

3. The hydrogen storage material according to claim 1, wherein the transition metal comprises at least one metal selected from the group consisting of titanium, vanadium, chromium, manganese, iron, cobalt, nickel, copper, zirconium, molybdenum, ruthenium, rhodium, palladium and lanthanoid series.

4. A method of manufacturing a hydrogen storage material according to claim 1, comprising:
introducing a first organic compound on a surface of and inside micropores of a porous material containing the transition metal;
obtaining a composite of the microporous carbon material containing the transition metal and the porous material by carbonizing the first organic compound; and
removing the porous material from the composite.

5. The method of manufacturing a hydrogen storage material according to claim 4, wherein obtaining the composite further comprises introducing a second organic compound on the surface of and inside the micropores of the porous material so as to deposit carbon.

6. A method of manufacturing a hydrogen storage material according to claim 1, comprising:
introducing an organic compound on a surface of and inside micropores of a porous material, and obtaining a composite of the microporous carbon material and the porous material by carbonizing the organic compound;
removing the porous material from the composite; and
supporting the transition metal on surfaces of the microporous carbon material by immersing the microporous carbon material obtained by removing the porous material from the composite in a transition metal salt solution.

7. The method of manufacturing a hydrogen storage material according to claim 6, wherein supporting the transition metal comprises:
immersing the microporous carbon material in the transition metal salt solution so as to obtain a mixed liquid;
separating the microporous carbon material to which the transition metal is adsorbed by centrifugation after stirring the mixed liquid under reduced pressure;
mixing a reductant solution with the microporous carbon material to which the transition metal is adsorbed obtained by separating the microporous carbon material, and reducing the adsorbed transition metal in a liquid phase so as to deposit the transition metal on the surface of and inside the micropores of the microporous carbon material; and
drying the microporous carbon material on which the transition metal is deposited after washing with pure water.

8. The method of manufacturing a hydrogen storage material according to claim 7, wherein the reductant solution contains a hydrido complex.

9. The method of manufacturing a hydrogen storage material according to claim 8, wherein the hydrido complex includes any one of sodium borohydride, lithium borohydride, sodium cyanoborohydride, zinc borohydride, and sodium triacetoxyborohydride.

10. The method of manufacturing a hydrogen storage material according to claim 6, wherein supporting the transition metal comprises:
immersing the microporous carbon material in the transition metal salt solution so as to obtain a mixed liquid;
separating the microporous carbon material to which the transition metal is adsorbed from the mixed liquid by evaporating to dryness; and
reducing the transition metal in the microporous carbon material obtained by evaporating to dryness by a gas-phase reduction using hydrogen.

11. The method of manufacturing a hydrogen storage material according to claim 6, wherein a solvent used for the transition metal salt solution includes a primary alcohol or ether.

12. The method of manufacturing a hydrogen storage material according to claim 4, wherein the porous material is zeolite.

13. A hydrogen storage method using the hydrogen storage material according to claim 1, wherein hydrogen is adsorbed and desorbed at a temperature within a range from −40° C. to 150° C.

* * * * *